United States Patent
Onishi

(10) Patent No.: US 10,333,348 B2
(45) Date of Patent: Jun. 25, 2019

(54) CONTROL DEVICE, ELECTRONIC APPARATUS, AND CONTACTLESS POWER TRANSMISSION SYSTEM

(71) Applicant: SEIKO EPSON CORPORATION, Tokyo (JP)

(72) Inventor: Kota Onishi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 56 days.

(21) Appl. No.: 15/572,459

(22) PCT Filed: May 13, 2016

(86) PCT No.: PCT/JP2016/002344
§ 371 (c)(1),
(2) Date: Nov. 7, 2017

(87) PCT Pub. No.: WO2016/181658
PCT Pub. Date: Nov. 17, 2016

(65) Prior Publication Data
US 2018/0123395 A1 May 3, 2018

(30) Foreign Application Priority Data

May 13, 2015 (JP) ................................. 2015-098046

(51) Int. Cl.
*H02J 50/10* (2016.01)
*H02J 7/00* (2006.01)
(Continued)

(52) U.S. Cl.
CPC ................ *H02J 50/10* (2016.02); *H02J 7/00* (2013.01); *H02J 7/025* (2013.01); *H02J 50/80* (2016.02)

(58) Field of Classification Search
CPC combination set(s) only.
See application file for complete search history.

(56) References Cited

U.S. PATENT DOCUMENTS

| 8,026,694 B2 | 9/2011 | Kamijo et al. |
| 8,054,036 B2 | 11/2011 | Onishi et al. |

(Continued)

FOREIGN PATENT DOCUMENTS

| EP | 2 894 755 A1 | 7/2015 |
| JP | S53-005959 A | 1/1978 |

(Continued)

OTHER PUBLICATIONS

Jul. 5, 2016 International Search Report issued in International Patent Application No. PCT/JP2016/002344.
(Continued)

*Primary Examiner* — Adam D Houston
(74) *Attorney, Agent, or Firm* — Oliff PLC

(57) ABSTRACT

A control device that can perform discharging execution and stop of a power receiving device included in a contactless power transmission, electronic apparatus, contactless power transmission system, and the like. The control device is on a receiving side in a contactless power transmission system including a power transmitting device and a power receiving device, and includes: a charging unit that charges a battery based on power received by a power receiving unit that receives power from the power transmitting device; a discharging unit that performs an operation of discharging the battery; a control unit that controls the discharging unit; and a monitoring unit that monitors the operation state of a switch unit. The control unit causes the discharging unit to discharge when removal of the power receiving device has been detected, and stops the discharging when an off operation of the switch unit has been detected by the monitoring unit.

12 Claims, 19 Drawing Sheets

(51) Int. Cl.
*H02J 50/80* (2016.01)
*H02J 7/02* (2016.01)

(56) References Cited

U.S. PATENT DOCUMENTS

| | | | | |
|---|---|---|---|---|
| 2007/0228833 | A1* | 10/2007 | Stevens | H02J 5/005 |
| | | | | 307/45 |
| 2008/0210762 | A1* | 9/2008 | Osada | G06K 19/0701 |
| | | | | 235/492 |
| 2009/0174264 | A1 | 7/2009 | Onishi et al. | |
| 2012/0235508 | A1* | 9/2012 | Ichikawa | H04B 5/0087 |
| | | | | 307/104 |
| 2012/0293006 | A1* | 11/2012 | Kim | H04B 5/0031 |
| | | | | 307/104 |
| 2014/0239908 | A1 | 8/2014 | Ichikawa et al. | |
| 2016/0211703 | A1* | 7/2016 | Eguchi | H04B 5/0037 |
| 2017/0179729 | A1* | 6/2017 | Porat | H02J 50/12 |
| 2018/0123395 | A1* | 5/2018 | Onishi | H02J 7/00 |
| 2018/0123646 | A1* | 5/2018 | Onishi | H02J 50/10 |
| 2018/0131231 | A1* | 5/2018 | Nakano | H02J 7/00 |
| 2018/0138759 | A1* | 5/2018 | Onishi | H02J 7/00 |
| 2018/0152041 | A1* | 5/2018 | Onishi | H01M 10/44 |
| 2018/0254666 | A1* | 9/2018 | Onishi | H02J 50/10 |
| 2018/0262061 | A1* | 9/2018 | Tanabe | H02J 50/60 |
| 2018/0323648 | A1* | 11/2018 | Joye | H02J 50/12 |
| 2018/0342902 | A1* | 11/2018 | Bae | H02J 5/00 |
| 2019/0001139 | A1* | 1/2019 | Mishra | A61N 1/36071 |
| 2019/0013698 | A1* | 1/2019 | Shichino | H02J 50/12 |
| 2019/0013728 | A1* | 1/2019 | Liu | H02M 1/32 |
| 2019/0052128 | A1* | 2/2019 | Van Wageningen | H02J 50/90 |

FOREIGN PATENT DOCUMENTS

| | | |
|---|---|---|
| JP | 2008-204916 A | 9/2008 |
| JP | 2008-206232 A | 9/2008 |
| JP | 2009-011129 A | 1/2009 |
| JP | 2012-204921 A | 10/2012 |
| JP | 2014-050270 A | 3/2014 |
| JP | 2014-166015 A | 9/2014 |
| WO | 2014/034523 A1 | 3/2014 |

OTHER PUBLICATIONS

Nov. 26, 2018 Extended Search Report issued in European Patent Application No. 16792385.3.

* cited by examiner

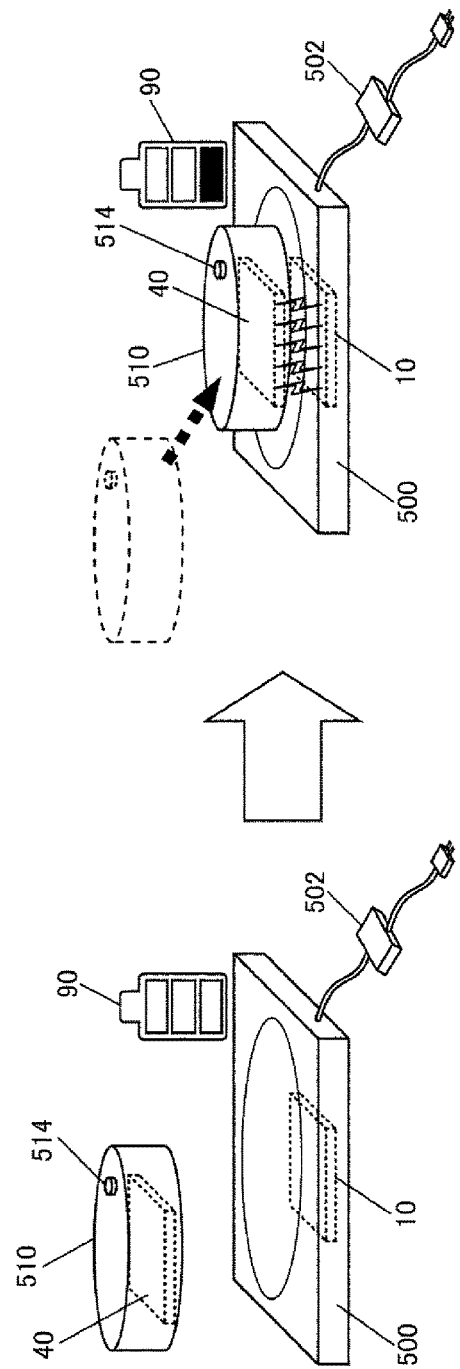
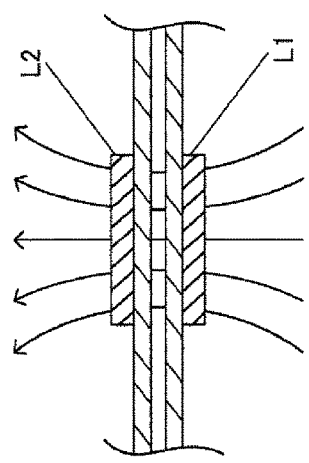
FIG. 1A
FIG. 1B

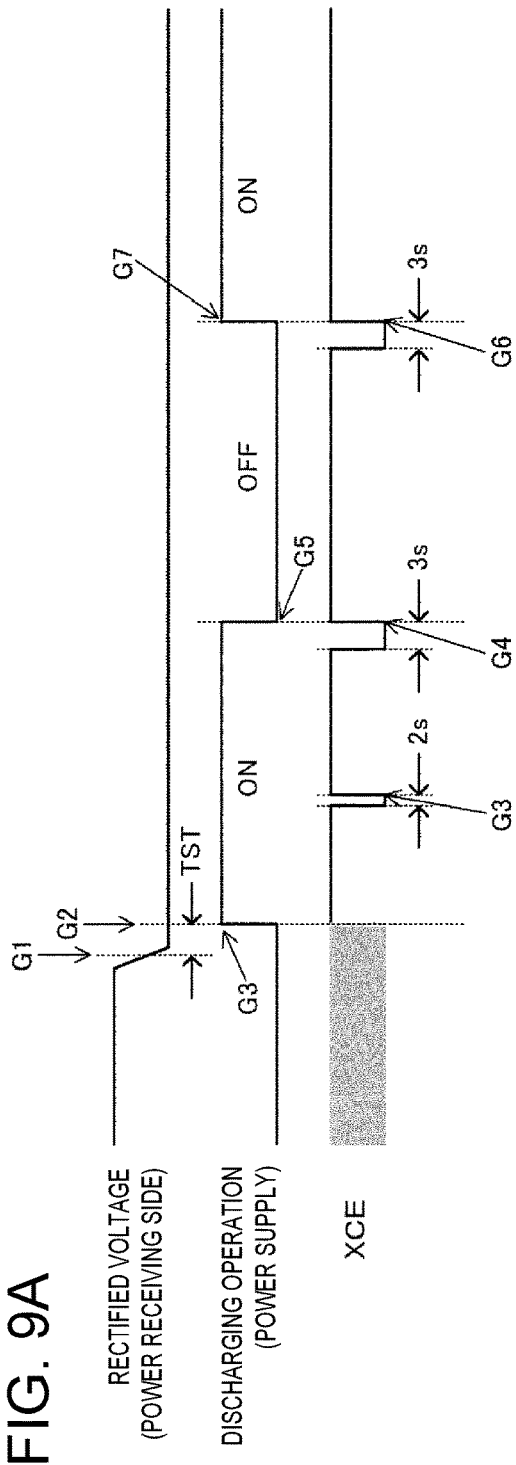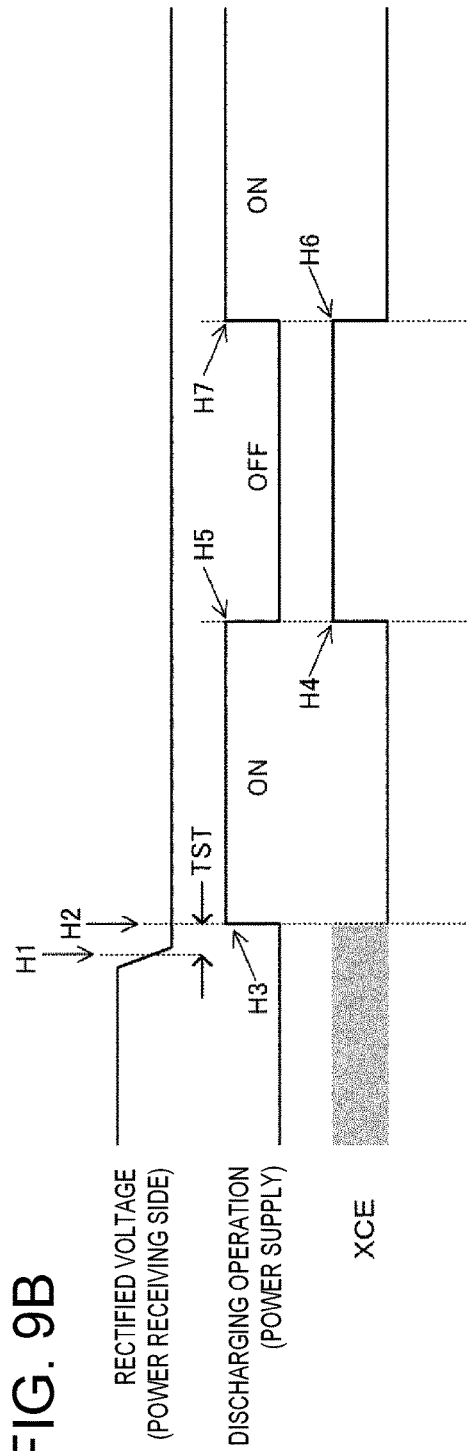

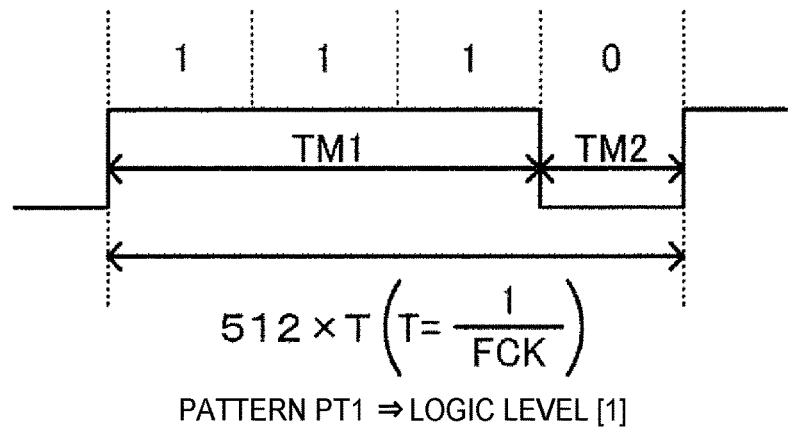
PATTERN PT1 ⇒ LOGIC LEVEL [1]
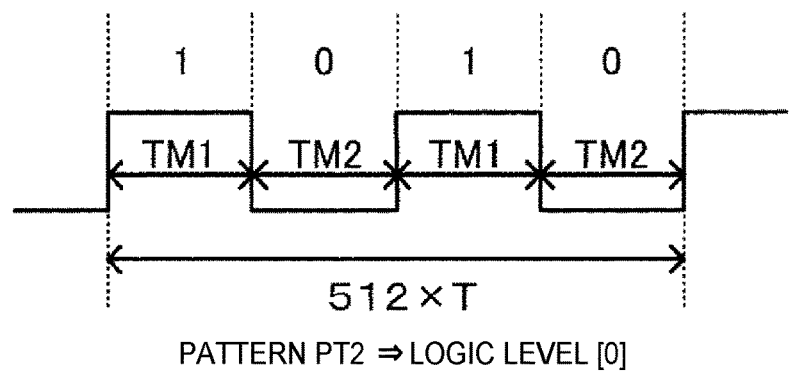
PATTERN PT2 ⇒ LOGIC LEVEL [0]
FIG. 15

FIG. 17A

| 16bit | 16bit | 16bit | 16bit |
|---|---|---|---|
| 00h | (1) DATA CODE + RECTIFICATION VOLTAGE | (2)(3)(4)(5)(6)(7) | (8)CRC |

FIG. 17B

| | bit15 | bit0 |
|---|---|---|
| (1) | DATA CODE | RECTIFICATION VOLTAGE |
| (2) | TEMPERATURE ||
| (3) | BATTERY VOLTAGE ||
| (4) | CHARGE CURRENT ||
| (5) | STATUS FLAG ||
| (6) | NUMBER OF CYCLES ||
| (7) | IC NUMBER ||
| (8) | CRC ||

CONTROL DEVICE, ELECTRONIC APPARATUS, AND CONTACTLESS POWER TRANSMISSION SYSTEM

TECHNICAL FIELD

The present invention relates to a control device, an electronic apparatus, a contactless power transmission system, and the like.

BACKGROUND ART

In recent years, much attention has been paid to contactless power transmission (wireless power transfer) in which electromagnetic induction is used to make power transmission possible without a metal contact. Charging of electronic apparatuses such as a household appliance and a mobile terminal has been proposed as an application example of the contactless power transmission.

Various charging control methods in contactless power transmission have also been disclosed. For example, a method is disclosed in Patent Document 1 in which an operating state of a charging control unit of a power receiving device is maintained by performing power saving power transmission in a fully charged state. With the method disclosed in Patent Document 1, a smooth return to normal power transmission or suspension of power transmission when the power receiving device is removed while power saving power transmission is being performed can be easily realized, and therefore wasteful power consumption can be suppressed.

Also, a method is disclosed in Patent Document 2 in which a switch is provided on a power transmitting device side, and a tentative power transmission for authentication is performed based on the switch operation.

CITATION LIST

Patent Literature

Patent Document 1: JP-A-2008-206232
Patent Document 2: JP-A-2009-11129

SUMMARY OF INVENTION

Technical Problem

Patent Document 1 discloses a method in which power consumption is reduced by performing appropriate charging control, but a method for reducing power consumption after a power receiving device has been removed is not disclosed. In particular, in embodiments in which discharging operation is performed with removal of the power receiving device as a trigger, a method for reducing power consumption after the power receiving device has been removed is not known.

According to some aspects of the invention, a control device that can perform appropriate discharging execution and discharging stop of a power receiving device included in a contactless power transmission, an electronic apparatus, a contactless power transmission system, and the like can be provided.

Solution to Problem

One aspect of the invention relates to a control device on a receiving side in a contactless power transmission system including a power transmitting device and a power receiving device, the control device comprising: a charging unit that charges a battery based on power received by a power receiving unit that receives power from the power transmitting device; a discharging unit that performs an operation of discharging the battery and supplies power from the battery to a power supply target; a control unit that controls the discharging unit; and a monitoring unit that monitors the operation state of a switch unit. The control unit causes the discharging unit to perform discharging when removal of the power receiving device has been detected, and stops discharging of the discharging unit when an off operation of the switch unit has been detected by the monitoring unit.

According to one aspect of the invention, the control unit on the power receiving device in the contactless power transmission system causes the discharging unit to perform discharging when removal of the power receiving device has been detected, and stop discharging when an off operation has been detected. In this way, discharging can be started with removal as a trigger, and the started discharging can be stopped by operating the switch unit, and as a result, appropriate discharging control (energy saving control, for example) can be realized.

Also, according to one aspect of the invention, the control unit may stop discharging of the discharging unit in a normal power transmission period.

Accordingly, reduction in power consumption in the normal power transmission period or the like can be realized.

Also, according to one aspect of the invention, the control device further includes a load modulation unit that transmits communication data to the power transmitting device by load modulation. The control unit may transmit the communication data to the power transmitting device by load modulation performed by the load modulation unit in the normal power transmission period.

Accordingly, appropriate information can be transmitted to the power transmitting device side using load modulation in the normal power transmission period.

Also, according to one aspect of the invention, the monitoring unit includes: a regulator that steps down a battery voltage; and a resistor that is provided between an output node of the regulator and one end of the switch unit. The monitoring unit may judge whether or not the off operation of the switch unit has been performed based on a voltage at the one end of the switch unit.

Accordingly, as a result of using a regulator and a resistor, the off operation of the switch unit can be detected.

Also, according to one aspect of the invention, the monitoring unit includes: an oscillator circuit that performs oscillation operation based on an output voltage of the regulator, and a timer that measures a period in which the voltage at the one end is at a first voltage level based on a clock signal from the oscillator circuit. The monitoring unit may judge whether or not the off operation of the switch unit has been performed based on a measurement result of the timer.

Accordingly, as a result of using an oscillator circuit and a timer, the off operation of the switch unit can be detected.

Also, according to one aspect of the invention, the control device further includes an over-discharge detection circuit that detects an overdischarged state of the battery. The monitoring unit may stop operation when the overdischarged state is detected by the over-discharge detection circuit.

Accordingly, the monitoring unit stops operation as well when the overdischarged state is detected, and as a result, further reduction in power consumption or the like can be realized.

Also, according to one aspect of the invention, the control unit may start discharging of the discharging unit when an on operation of the switch unit is detected by the monitoring unit after discharging of the discharging unit has stopped.

Accordingly, when the on operation is detected, discharging of the discharging unit can be started (restarted).

Also, according to one aspect of the invention, the control unit may start discharging of the discharging unit after a start-up period of the discharging operation has elapsed, the start-up period being initiated by a decrease in an output voltage of the power receiving unit.

Accordingly, discharging of the discharging unit can be started when the start-up period has elapsed, the start-up period being initiated by a decrease in an output voltage of the power receiving unit.

Also, according to one aspect of the invention, the control unit may start discharging of the discharging unit after the start-up period has elapsed after the output voltage of the power receiving unit has decreased below a judgement threshold.

Accordingly, reduction in the output voltage of the power receiving unit can be detected with reference to the judgement threshold.

Also, according to one aspect of the invention, the control unit may start a discharging operation of a capacitor, which is charged when the power receiving unit is receiving power, when the output voltage of the power receiving unit has decreased below the judgement threshold, and start discharging of the discharging unit when the voltage of the capacitor has decreased below a given threshold voltage.

Accordingly, judgement of the elapse of the start-up period or the like can be realized by comparing the voltage of the capacitor with the threshold voltage.

Also, another aspect of the invention relates to an electronic apparatus including the control device described above.

Also, another aspect of the invention relates to a contactless power transmission system including a power transmitting device and a power receiving device. The power transmitting device transmits power to the power receiving device. The power receiving device charges a battery based on power received from the power transmitting device, supplies power from the battery to a power supply target by performing a discharging operation of the battery, and monitors the operation state of a switch unit. The power receiving device performs the discharging operation of the battery when removal of the power receiving device is detected, and stops the discharging operation of the battery when an off operation of the switch unit is detected.

BRIEF DESCRIPTION OF DRAWINGS

FIGS. 1A and 1B are diagrams for describing a contactless power transmission system of a present embodiment.

FIGS. 9A and 9B are signal waveform diagrams for describing an operation sequence of the present embodiment.

FIG. 15 is a diagram for describing a communication method of the present embodiment.

FIGS. 17A and 17B are examples of a format of communication data.

DESCRIPTION OF EMBODIMENTS

Figure 2:
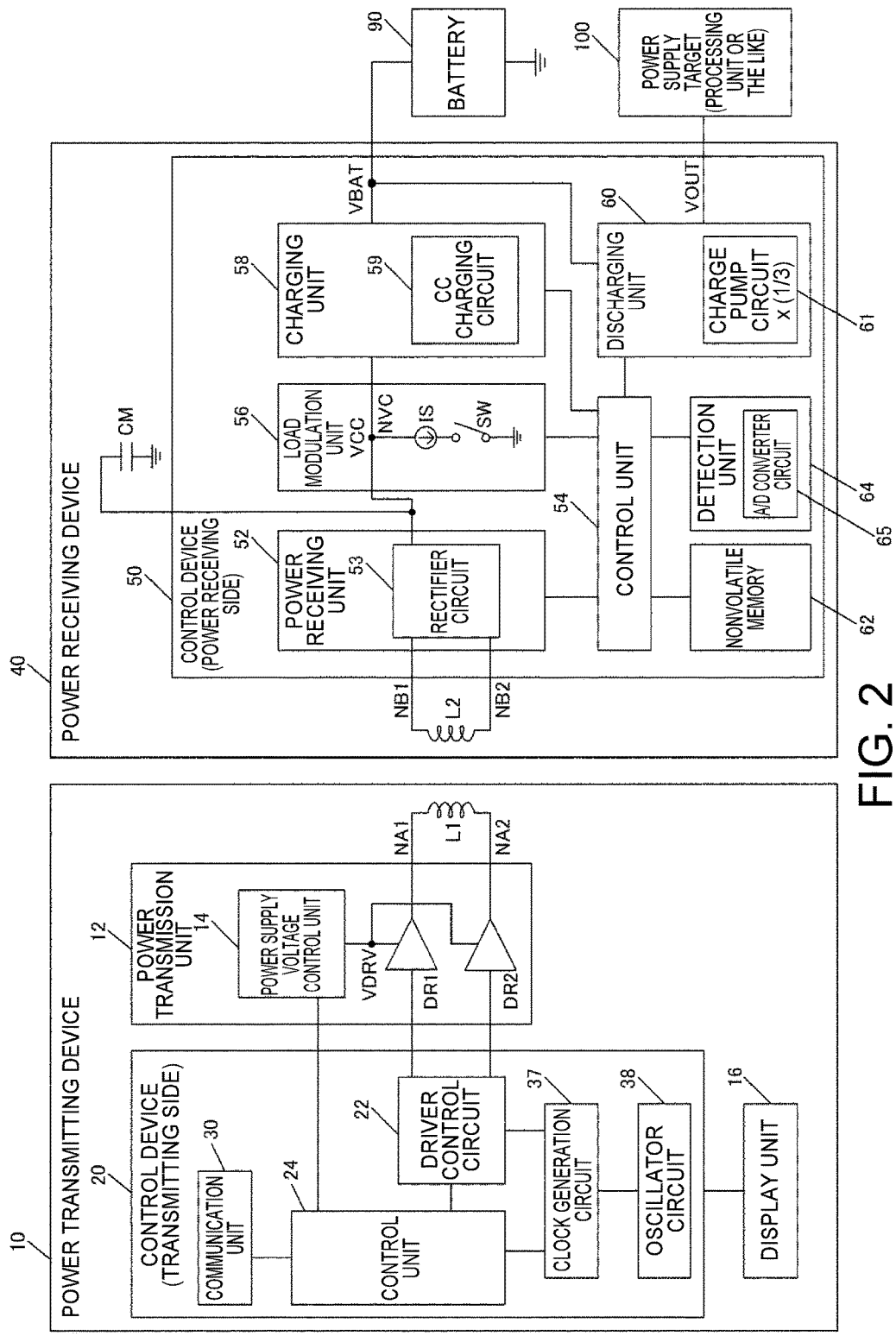
FIG. 2 is an exemplary configuration of a power transmitting device, a power receiving device, and control devices on a power transmitting side and a power receiving side of the present embodiment.

Hereinafter, a preferable embodiment of the invention will be described in detail. Note that the embodiment described below is not intended to unduly limit the content of the invention described in the scope of the claims, and not all configurations described in this embodiment are necessarily essential as solving means of the invention.

1. Electronic Apparatus

An example of a contactless power transmission system of the present embodiment is shown in FIG. 1A. A charger 500 (one of electronic apparatuses) includes a power transmitting device 10. An electronic apparatus 510 includes a power receiving device 40. Also, the electronic apparatus 510 includes an operation switch portion 514 and a battery 90. Note that, although the battery 90 is schematically illustrated in FIG. 1A, the battery 90 is, in actuality, incorporated in the electronic apparatus 510. The contactless power transmission system of the present embodiment is constituted by the power transmitting device 10 and the power receiving device 40 in FIG. 1A.

Power is supplied to the charger 500 via a power supply adapter 502, and this power is transmitted by contactless power transmission from the power transmitting device 10 to the power receiving device 40. Accordingly, the battery 90 in the electronic apparatus 510 can be charged and allow a device in the electronic apparatus 510 to operate.

Note that a power supply of the charger 500 may be a power supply using a USB (USB cable). Also, various apparatuses can be envisioned as the electronic apparatus 510 to which the present embodiment is applied. For example, various electronic apparatuses can be envisioned such as a hearing aid, a watch, a biological information measuring device (wearable apparatus), a mobile information terminal (such as a smartphone or a cellular phone), a cordless telephone, a shaver, an electric toothbrush, a wrist computer, a handy terminal, an electric car, and an electric bicycle.

As schematically shown in FIG. 1B, power transmission from the power transmitting device 10 to the power receiving device 40 is realized as a result of forming a power transmission transformer by electromagnetically coupling a primary coil L1 (power transmitting coil) provided on a power transmitting side and a secondary coil L2 (power receiving coil) provided on a power receiving side, or the like. Accordingly, contactless power transmission is made possible.

2. Power Transmitting Device, Power Receiving Device, Power Transmitting Side and Power Receiving Side Control Devices FIG. 2 shows an exemplary configuration of a power transmitting device 10, a power receiving device 40, a power transmitting side control device 20, and a power receiving side control device 50 of the present embodiment. Electronic apparatuses on the power transmitting side such as a charger 500 in FIG. 1A include at least the power transmitting device 10 in FIG. 2. Also, the electronic apparatus 510 on the power receiving side can include at least the power receiving device 40, the battery 90, and the power supply target 100. The power supply target 100 can be various devices such as a processing unit (such as DSP). According to the configuration in FIG. 2, a contactless power transmission (wireless power transfer) system is realized in which power is transmitted from the power transmitting device 10 to the power receiving device 40 by electromagnetically coupling the primary coil L1 and the secondary coil L2, and charging of the battery 90 and the like is performed.

The power transmitting device 10 (transmission module, primary module) includes the primary coil L1, a transmission unit 12, a display unit 16, and the control device 20. Note that the configuration of the power transmitting device 10 is not limited to the configuration in FIG. 2, and various modifications can be implemented such as omitting a portion (display unit, for example) of the constituent elements, adding another constituent element, or changing a connection relationship.

When power is to be transmitted, the transmission unit 12 generates an AC voltage of a predetermined frequency and supplies the generated AC voltage to the primary coil L1. The transmission unit 12 includes a first transmission driver DR1 that drives one end of the primary coil L1, a second transmission driver DR2 that drives the other end of the primary coil L1, and a power supply voltage control unit 14. Also, the transmission unit 12 can include at least one capacitor that constitutes a resonance circuit with the primary coil L1.

The transmission drivers DR1 and DR2 of the transmission unit 12 are each realized by an inverter circuit (buffer circuit) or the like that is constituted by a power MOS transistor, for example. These transmission drivers DR1 and DR2 are controlled (driven) by a driver control circuit 22 of the control device 20.

The power supply voltage control unit 14 in the power transmission unit 12 controls a power supply voltage VDRV of the power transmission drivers DR1 and DR2. For example, a control unit 24 controls the power supply voltage control unit 14 based on communication data received from the power receiving side. Accordingly, the power supply voltage VDRV supplied to the power transmission drivers DR1 and DR2 is controlled, and variable control of the transmitting power is realized, for example. The power supply voltage control unit 14 can be realized by a DC/DC converter or the like. For example, the power supply voltage control unit 14 performs a step-up operation on the power supply voltage (5 V, for example) from the power supply, generates a power supply voltage VDRV (6 V to 15 V, for example) for the power transmission drivers, and supplies the power supply voltage VDRV to the power transmission drivers DR1 and DR2. Specifically, when increasing the transmitting power from the power transmitting device 10 to the power receiving device 40, the power supply voltage control unit 14 increases the power supply voltage VDRV that is supplied to the power transmission drivers DR1 and DR2, and when decreasing the transmitting power, the power supply voltage control unit 14 decreases the power supply voltage VDRV.

A power transmission transformer is formed when the primary coil L1 (transmission side coil) is electromagnetically coupled to the secondary coil L2 (receiving side coil). For example, when power transmission is needed, the electronic apparatus 510 is placed on the charger 500 so as to be in a state in which a magnetic flux of the primary coil L1 passes through the secondary coil L2, as shown in FIGS. 1A and 1B. On the other hand, when power transmission is not needed, the electronic apparatus 510 is physically separated from the charger 500 so as to be in a state in which the magnetic flux of the primary coil L1 does not pass through the secondary coil L2.

The display unit 16 displays various states (such as being in power transmission or ID authentication) of the contactless power transmission system using a color, an image, or the like, and can be realized by an LED, an, LCD, or the like.

The control device 20 performs various types of control on the power transmitting side, and can be realized by an integrated circuit device (IC) or the like. The control device 20 includes the driver control circuit 22, the control unit 24, and a communication unit 30. Also, the control device 20 can include a clock generation circuit 37 and an oscillator circuit 38. Note that the control device 20 is not limited to the configuration in FIG. 2, and various modifications can be implemented such as omitting a portion (such as the clock generation circuit or the oscillator circuit) of the constituent elements, adding another constituent element, or changing connection relationships. For example, a modification in which the power transmission unit 12 or the like is incorporated in the control device 20 can be implemented.

The driver control circuit 22 controls the power transmission drivers DR1 and DR2 in the power transmission unit 12 that transmits power to the power receiving device 40. For example, the driver control circuit 22 outputs a control signal (drive signal) to gates of transistors that constitute the power transmission drivers DR1 and DR2, and causes the power transmission drivers DR1 and DR2 to drive the primary coil L1.

The control unit 24 executes various types of control processing of the transmitting side control device 20. For example, the control unit 24 controls the driver control circuit 22. Specifically, the control unit 24 performs various types of sequence control and judgement processing necessary for power transmission, communication processing, and the like. The control unit 24 can be realized by a logic circuit such as a gate array that is generated by an automated place-and-route method, or various processors such as a microcomputer, for example.

The communication unit 30 performs communication processing for the communication of communication data with the power receiving device 40. For example, the communication unit 30 performs communication processing for communication with the power receiving device 40

(control device 50) that transmits communication data by load modulation. Specifically, the communication unit 30 performs processing for detecting and receiving communication data from the power receiving device 40.

The oscillator circuit 38 is constituted by a crystal-oscillator circuit or the like, and generates a clock signal for the primary side. The clock generation circuit 37 generates a drive clock signal that defines a drive frequency, or the like. Also, the driver control circuit 22 generates a control signal having a given frequency (drive frequency) based on the drive clock signal, the control signal from the control unit 24, and the like, and outputs the control signal to the power transmission drivers DR1 and DR2 in the power transmission unit 12 for control.

The power receiving device 40 (power receiving module, secondary module) includes the secondary coil L2 and the control device 50. Note that the power receiving device 40 is not limited to the configuration in FIG. 2, and various modifications can be implemented such as omitting a portion of the constituent elements, adding another constituent element, or changing connection relationships.

The control device 50 performs various types of control on the power receiving side, and is realized by an integrated circuit device (IC) or the like. The control device 50 includes a power receiving unit 52, a control unit 54, a load modulation unit 56, a charging unit 58, and a discharging unit 60. Also, the control device 50 can include a nonvolatile memory 62 and a detection unit 64. Note that the control device 50 is not limited to the configuration in FIG. 2, and various modifications can be implemented such as omitting a portion of the constituent elements, adding another constituent element, or changing connection relationships. For example, a modification is possible in which the power receiving unit 52 or the like is provided outside the control device 50.

The power receiving unit 52 receives power from the power transmitting device 10. Specifically, the receiving unit 52 converts an AC voltage induced in the secondary coil L2 to a DC rectified voltage VCC, and outputs the rectified voltage VCC. This conversion is performed by a rectifier circuit 53 included in the power receiving unit 52. The rectifier circuit 53 can be realized by a plurality of transistors, diodes, and the like.

The control unit 54 performs various types of control processing on the receiving side control device 50. For example, the control unit 54 controls a load modulation unit 56, a charging unit 58, and a discharging unit 60. Also, the control unit 54 can control the power receiving unit 52, the nonvolatile memory 62, the detection unit 64, and the like. The control unit 54 can be realized by a logic circuit such as a gate array that is generated by an automated place-and-route method, or various processors such as a microcomputer, for example.

The load modulation unit 56 performs load modulation. For example, the load modulation unit 56 includes a current source IS, and performs load modulation using the current source IS. Specifically, the load modulation unit 56 includes the current source IS (constant current source) and a switching element SW. The current source IS and the switching element SW are provided in series between a node NVC of the rectified voltage VCC and a GND (low potential side power supply voltage, in a broad sense) node, for example. The switching element SW is turned on and off based on a control signal from the control unit 54, for example, and a current (constant current) of the current source IS that flows from the node NVC to GND is caused to flow or cut off, and thereby the load modulation is realized.

Note that one end of a capacitor CM is connected to the node NVC. The capacitor CM is provided as a component external to the control device 50, for example. Also, the switching element SW can be realized by a MOS transistor or the like. The switching element SW may be provided as a portion of the transistors that constitute a circuit of the current source IS. Also, the load modulation unit 56 is not limited to the configuration in FIG. 2, and various modifications such as using a resistor in place of the current source IS can be implemented.

The charging unit 58 charges (charging control) the battery 90. For example, the charging unit 58 charges the battery 90 based on the power received by the power receiving unit 52 that receives power from the power transmitting device 10. For example, the charging unit 58 is supplied with a voltage that is based on the rectified voltage VCC (DC voltage, in a broad sense) from the power receiving unit 52, and charges the battery 90. The charging unit 58 may include a CC charging circuit 59. The CC charging circuit 59 is a circuit that performs CC (Constant-Current) charging of the battery 90.

The discharging unit 60 performs a discharging operation for discharging the battery 90. For example, the discharging unit 60 (power supply unit) performs the discharging operation for discharging the battery 90, and supplies power from the battery 90 to a power supply target 100. For example, the discharging unit 60 is supplied with a battery voltage VBAT from the battery 90, and supplies an output voltage VOUT to the power supply target 100. The discharging unit 60 can include a charge pump circuit 61. The charge pump circuit 61 steps down the battery voltage VBAT (to a third of the input voltage, for example), and supplies the stepped down voltage to the power supply target 100 as the output voltage VOUT (VBAT/3). The discharging unit 60 (charge pump circuit) operates with the battery voltage VBAT as the power supply voltage.

The battery 90 is, for example, a rechargeable secondary battery, and is a lithium battery (such as a lithium ion secondary battery or a lithium ion polymer secondary battery), a nickel battery (such as a nickel-hydrogen storage battery or a nickel-cadmium storage battery), or the like. The power supply target 100 is a device (integrated circuit device) such as a processing unit (DSP, microcomputer) that is provided in the electronic apparatus 510 (FIG. 1A) in which the power receiving device 40 is incorporated, and is a power supply target of the battery 90.

The nonvolatile memory 62 is a nonvolatile memory device that stores various types of information. The nonvolatile memory 62 stores various types of information such as status information of the power receiving device 40 (control device 50), for example. An EEPROM or the like can be used as the nonvolatile memory 62. A MONOS (Metal-Oxide-Nitride-Oxide-Silicon) type memory can be used as the EEPROM, for example. A flash memory using a MONOS type memory can be used, for example. Alternatively, other types of memories such as a floating-gate type memory may be used as the EEPROM.

The detection unit 64 performs various detection operations. For example, the detection unit 64 performs various detection operations by monitoring the rectified voltage VCC, the battery voltage VBAT, and the like. Specifically, the detection unit 64 includes an A/D converter circuit 65, performs A/D conversion on voltages based on the rectified voltage VCC and the battery voltage VBAT, a temperature detection voltage from an unshown temperature detection unit, and the like with the A/D converter circuit 65, and executes a detection operation using the obtained digital A/D converted values. Detection of over-discharge, over-voltage, over-current, and abnormal temperature (high temperature, low temperature) are envisioned as detection operations performed by the detection unit 64. For example, over-voltage protection, high temperature protection, and low temperature protection can be realized by the detection unit 64 detecting over-voltage and abnormal temperature during the charging. Also, over-discharge protection and over-current protection can be realized by the detection unit 64 detecting over-discharge and over-current during the discharging.

3. Operation Sequence of Contactless Power Transmission System

Figure 3:
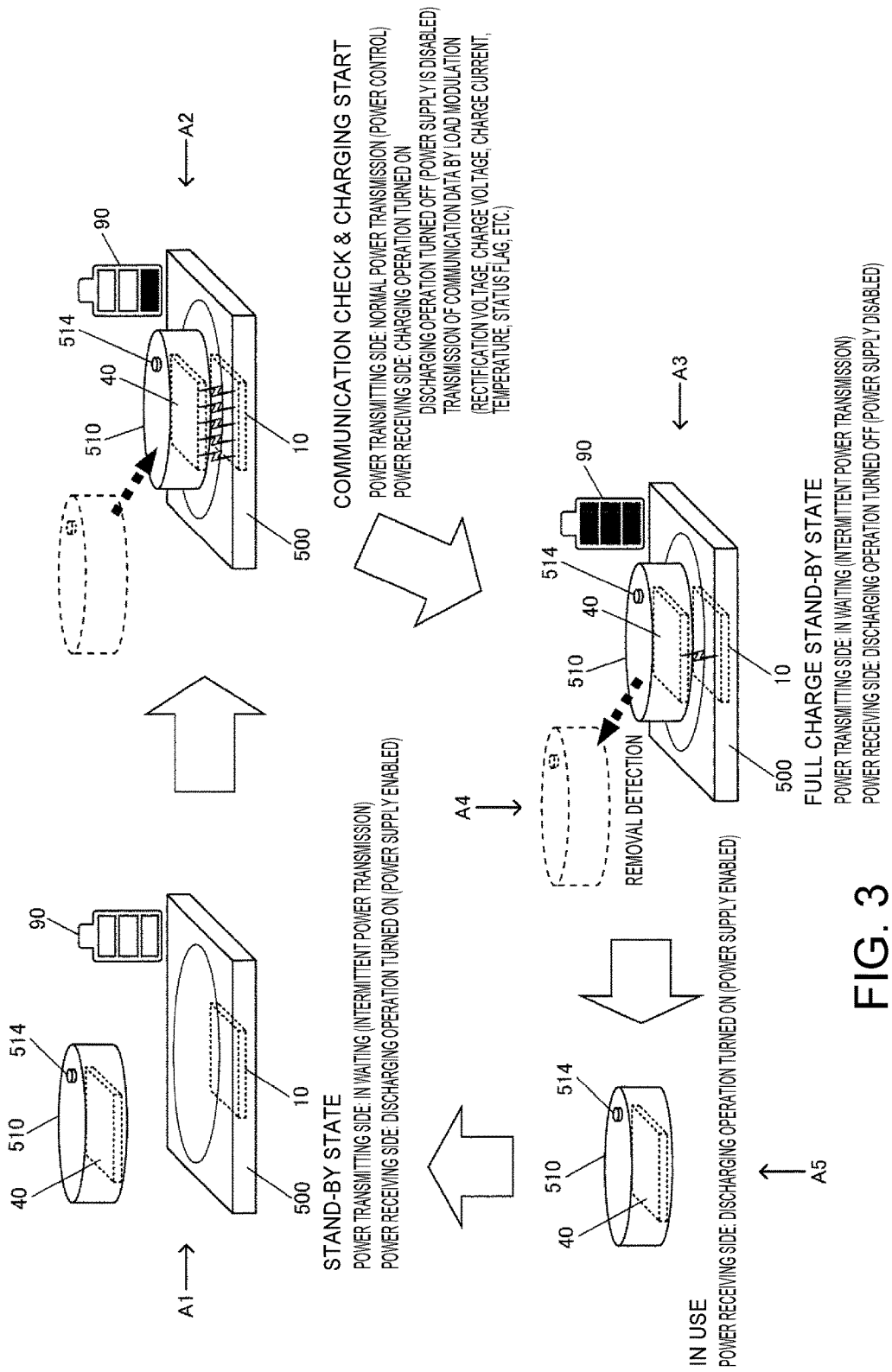
FIG. 3 is a diagram for describing an outline of an operation sequence of the contactless power transmission system of the present embodiment.

Next, an example of an operation sequence of the contactless power transmission system of the present embodiment will be described. FIG. 3 is a diagram for describing the outline of the operation sequence.

In A1 in FIG. 3, the electronic apparatus 510 including the power receiving device 40 is not placed on the charger 500 including the power transmitting device 10, and is in a removed state. In this case, a stand-by state is realized. In the stand-by state, the power transmitting side is in a waiting state, and the power receiving side is in a state where the discharging operation is turned on.

Specifically, in the stand-by state, the power transmission unit 12 of the power transmitting device 10 performs intermittent power transmission for landing detection. That is, the power transmission unit 12 is in a state in which continuous power transmission such as normal power transmission is not performed, and intermittent power transmission in which power is intermittently transmitted at given intervals is performed so as to detect landing of the electronic apparatus 510. Also, in the stand-by state, the operation for discharge to the power supply target 100 is turned on in the power receiving device 40, and power supply to the power supply target 100 is enabled. That is, the discharging unit 60 in the power receiving device 40 performs an operation of discharging the power from the battery 90 to the power supply target 100. Accordingly, the power supply target 100 such as a processing unit is supplied with the power from the battery 90, and can operate.

As shown in A2 in FIG. 3, when the electronic apparatus 510 is placed on the charger 500, and landing is detected, a communication check & charge state is realized. In the communication check & charge state, normal power transmission is performed on the power transmitting side, and the charging operation is turned on and the discharging operation is turned off on the power receiving side. Also, transmission of the communication data by load modulation is performed on the power receiving side.

Specifically, in the communication check & charge state, the power transmission unit 12 in the power transmitting device 10 performs normal power transmission which is continuous power transmission. Here, the power transmission unit 12 performs normal power transmission while performing power control in which the power is variably changed depending on the state of power transmission or the like. Also, control based on the charge state of the battery 90 is performed. The power transmission state is a state determined by a positional relationship (distance between coils or the like) between the primary coil L1 and the secondary coil L2 or the like, and can be determined based on information such as the rectified voltage VCC which is the output voltage from the power receiving unit 52. The charge state of the battery 90 can be determined based on the information such as the battery voltage VBAT.

Also, in the communication check & charge state, the charging operation of the charging unit 58 in the power receiving device 40 is turned on, and charging of the battery 90 is performed based on the power received by the power receiving unit 52. Also, the discharging operation of the discharging unit 60 is turned off, and power from the battery 90 is not supplied to the power supply target 100. Also, in the communication check & charge state, communication data is transmitted to the power transmitting side by load modulation performed by the load modulation unit 56. For example, communication data including power transmission status information (such as VCC), charge status information (such as VBAT and various status flags), and information such as a temperature is transmitted from the power receiving side to the power transmitting side by regular load modulation in a normal power transmission period. For example, power control by the power supply voltage control unit 14 in the power transmission unit 12 is performed based on the power transmission status information or the like included in the communication data.

As shown in A3 in FIG. 3, when full charge of the battery 90 is detected, a full charge stand-by state is realized. In the full charge stand-by state, the power transmitting side is in a waiting state, and the power receiving side is in a state in which the discharging operation remains off.

Specifically, the power transmission unit 12 performs intermittent power transmission for removal detection, for example. That is, the power transmission unit 12 is in a state in which continuous power transmission such as normal power transmission is not performed, and intermittent power transmission in which power is intermittently transmitted at given intervals is performed so as to detect removal of the electronic apparatus 510. Also, the discharging operation of the discharging unit 60 remains off, and the power supply to the power supply target 100 remains to be disabled.

When removal of the electronic apparatus 510 is detected as shown in A4 in FIG. 3, the electronic apparatus 510 is in a use state, and the discharging operation of the power receiving side is turned on, as shown in A5 in FIG. 3.

Specifically, the discharging operation of the discharging unit 60 is switched from off to on, and the power from the battery 90 is supplied to the power supply target 100 via the discharging unit 60. Accordingly, power from the battery 90 is supplied, the power supply target 100 such as a processing unit operates with the power, and the electronic apparatus 510 is in a state in which a user can use it normally.

In the present embodiment, as described above, when landing of the electronic apparatus 510 is detected, normal power transmission is performed, and regular load modulation is performed in the normal power transmission period, as shown in A2 in FIG. 3. Also, when landing is detected, the discharging operation of the discharging unit 60 is stopped. In this regular load modulation, communication data including information for controlling power on the power transmitting side, and information representing status on the power receiving side is transmitted from the power receiving side to the power transmitting side. For example, by transmitting the information (power transmission status information) for power control, optimum power control based on the positional relationship or the like between the primary coil L1 and the secondary coil L2 can be realized, for example. Also, by transmitting the information representing the status on the power receiving side, an optimum and safe charging environment can be realized. Also, in the present embodiment, normal power transmission continues while the load modulation continues, and the discharging operation of the discharging unit 60 remains off.

Also, in the present embodiment, when full charge of the battery 90 is detected, normal power transmission is stopped, and intermittent power transmission for removal detection is performed, as shown in A3 in FIG. 3. When removal is detected and a removed period begins, the discharging operation of the discharging unit 60 is performed, as shown in A4 and A5. Accordingly, power from the battery 90 is supplied to the power supply target 100, and normal operation of the electronic apparatus 510 becomes possible. Note that landing detection and removal detection are performed based on the output voltage (rectified voltage VCC, for example) of the power receiving unit 52.

In the present embodiment, as described above, the discharging operation for discharge to the power supply target 100 is turned off in a charge period (normal power transmission period) of the battery 90 in the electronic apparatus 510, and therefore a situation in which power is wastefully consumed in the charge period by the power supply target 100 can be suppressed.

When removal of the electronic apparatus 510 is detected, the discharging operation for discharge to the power supply target 100 is turned on along with switching being performed from normal power transmission to intermittent power transmission. As a result of the discharging operation being turned on, power from the battery 90 is supplied to the power supply target 100, and a normal operation of the power supply target 100 such as a processing unit (DSP) becomes possible. In this way, an operation sequence of preferable contactless power transmission can be realized in a type of electronic apparatus 510 (electronic apparatus such as a hearing aid that is worn by a user) that does not operate in the charge period during which the electronic apparatus 510 is placed on the charger 500, for example. That is, energy saving can be realized in such a type of electronic apparatus 510 as a result of the discharging operation to discharge power from the battery 90 being turned off in the charge period (normal power transmission period). As a result of the discharging operation being automatically turned on when removal is detected, power from the battery 90 is supplied to various devices that are power supply targets 100 of the electronic apparatus 510 so that the devices can operate, and the electronic apparatus 510 can automatically shift to a normal operation mode.

Figure 4:
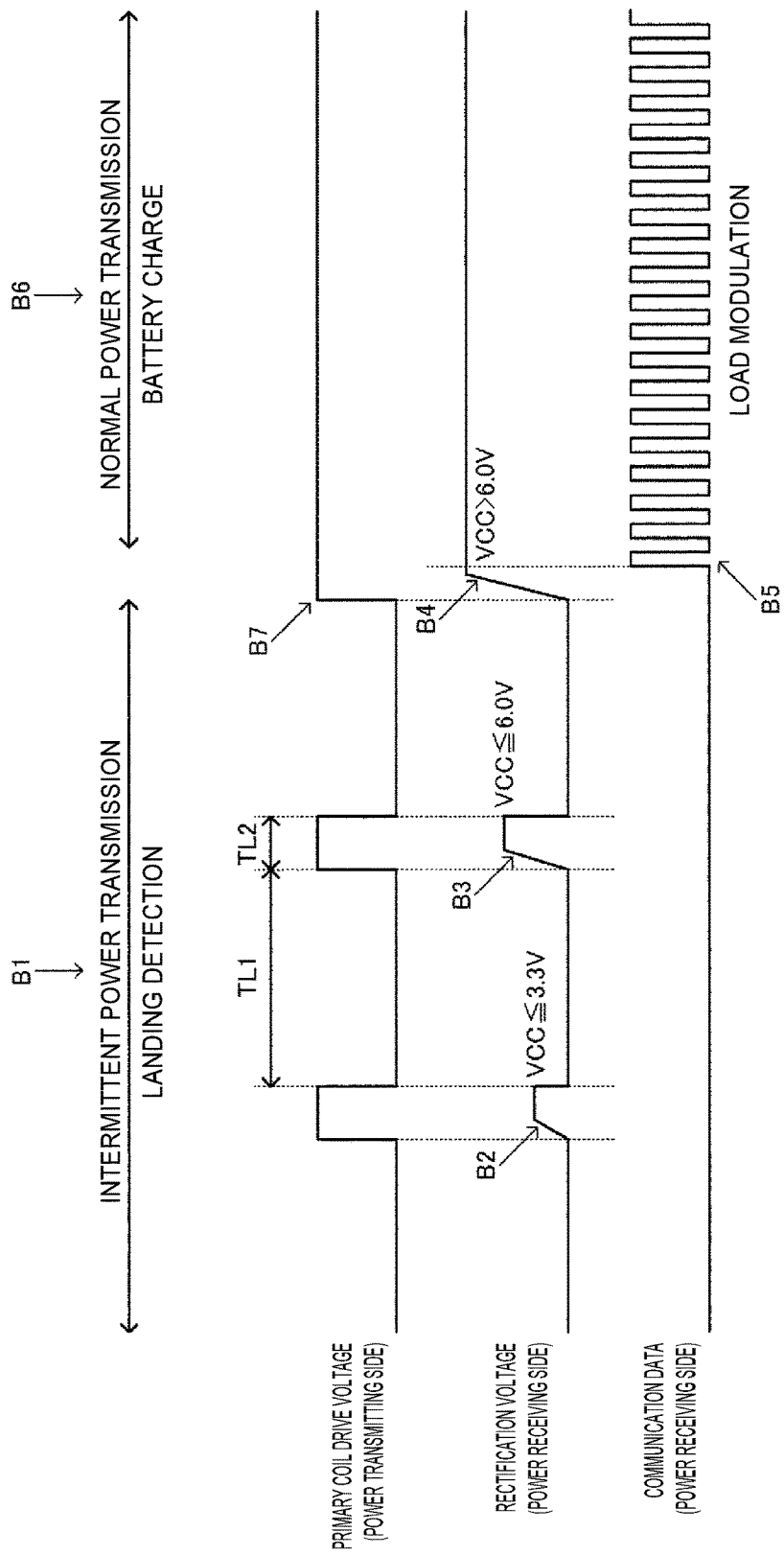
FIG. 4 is a signal waveform diagram for describing an operation sequence of the present embodiment.
Figure 5:
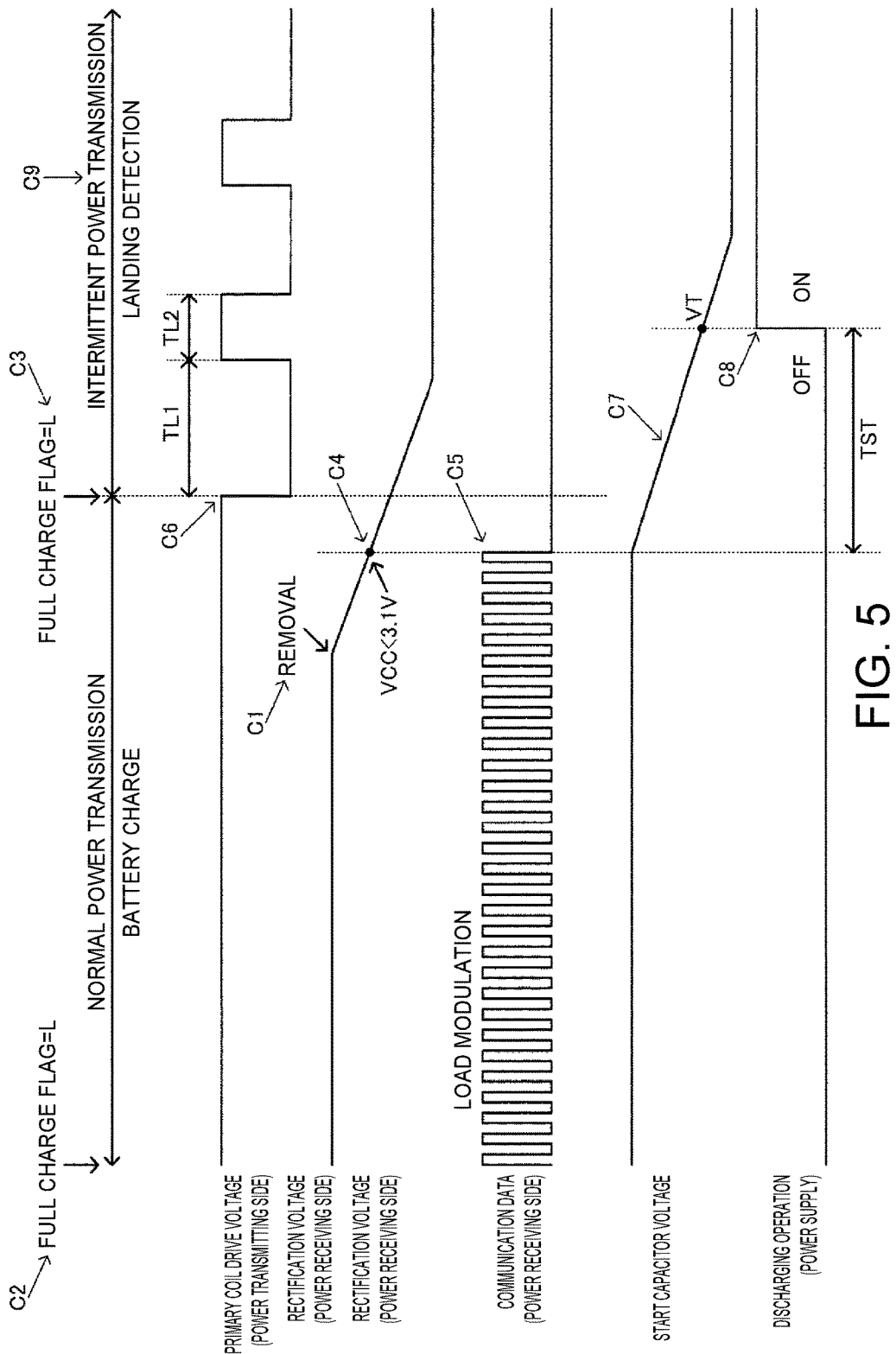
FIG. 5 is a signal waveform diagram for describing an operation sequence of the present embodiment.
Figure 6:
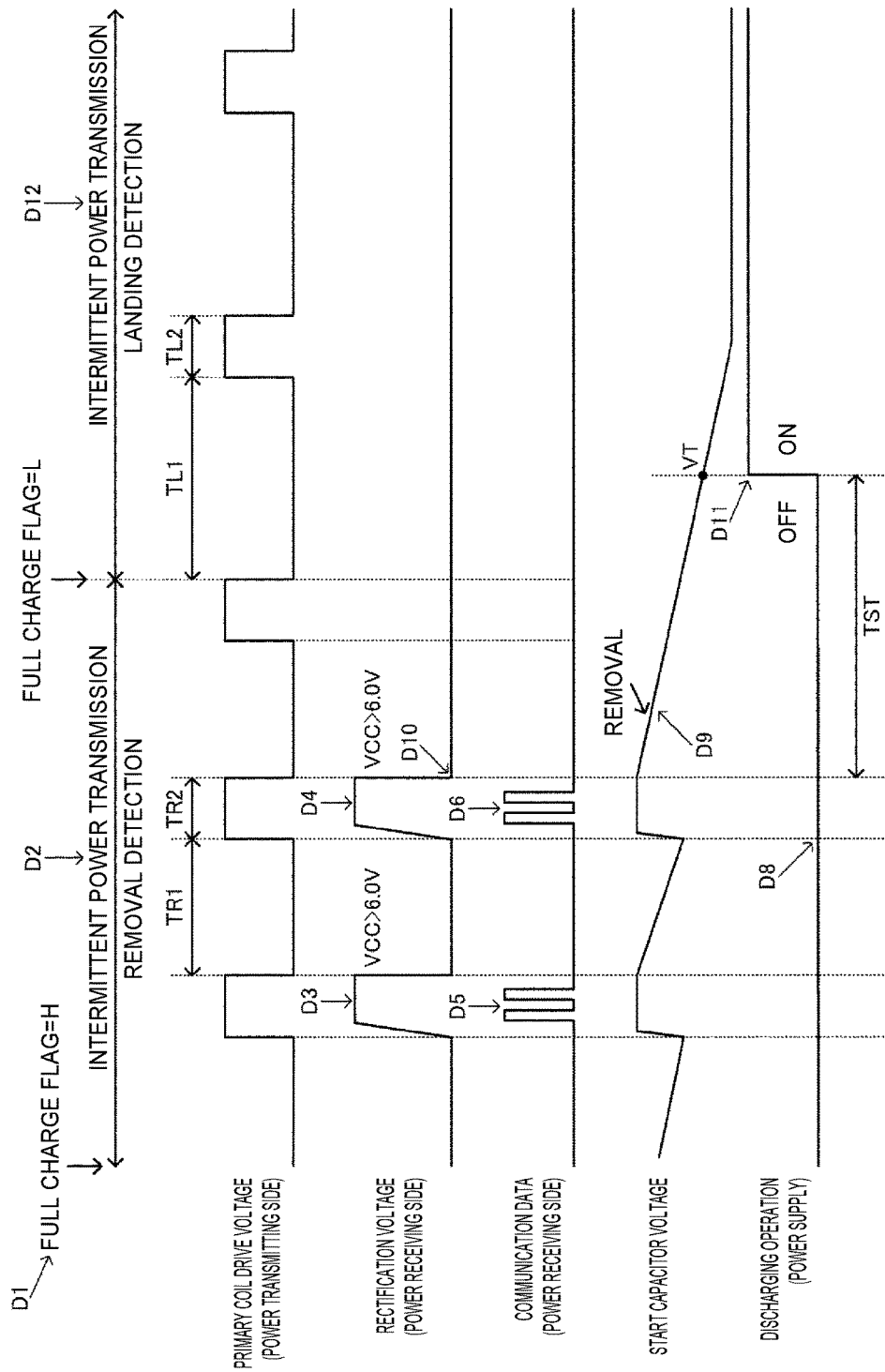
FIG. 6 is a signal waveform diagram for describing an operation sequence of the present embodiment.

FIGS. 4 to 6 are signal waveform diagrams for describing an operation sequence of the contactless power transmission system of the present embodiment.

B1 in FIG. 4 is the stand-by state in A1 in FIG. 3, and intermittent power transmission for landing detection is performed. That is, power transmission of a period TL2 is performed at the intervals of a period TL1. The period of TL1 is 3 s for example, and the period of TL2 is 50 ms for example. In B2 and B3 in FIG. 4, the rectified voltage VCC that is the output voltage of the power receiving unit 52 is less than or equal to 6.0 V, and therefore, communication by load modulation is not performed.

On the other hand, in B4, the rectified voltage VCC exceeds 6.0 V that is the threshold voltage for landing detection, and therefore the load modulation unit 56 starts load modulation, as shown in B5. That is, although the coils L1 and L2 are not in a sufficiently electromagnetically coupled state in B2 and B3, the coils L1 and L2 are in a properly electromagnetically coupled state in B4, as shown in FIG. 1B. Accordingly, the rectified voltage VCC increases and exceeds 6.0 V, and load modulation is started. Then, when this load modulation (null communication data) is detected on the power transmitting side, normal power transmission by the power transmission unit 12 is started as shown in B6. The normal power transmission in B6 is continuous power transmission that is different from the intermittent power transmission in B1, and charging of the battery 90 by the charging unit 58 is started by the power received due to the normal power transmission. At this time, a discharging operation of the discharging unit 60 is turned off. Also, the communication data including various types of information such as the rectified voltage, the battery voltage, or the status flag is transmitted from the power receiving side to the power transmitting side by the load modulation shown in B5, and power transmission control is executed. Note that the start of the load modulation in B5 is triggered by the increase of the rectified voltage VCC due to the intermittent power transmission for landing detection shown in B7.

In C1 in FIG. 5, the electronic apparatus 510 is removed in the normal power transmission period during which charging of the battery 90 is performed. The removal in C1 is a removal before the battery 90 is fully charged, as shown in C2 and C3. That is, it is a removal in a state in which a full charge flag is at a low level that is an inactive level.

When the electronic apparatus 510 is removed in this way, the power on the power transmitting side is not transmitted to the power receiving side, and the rectified voltage VCC which is the output voltage of the power receiving unit 52 decreases. Then, when VCC has decreased below 3.1 V, for example, as shown in C4, load modulation by the load modulation unit 56 is stopped, as shown in C5. When load modulation is stopped, normal power transmission by the power transmission unit 12 is stopped, as shown in C6.

Also, when the rectified voltage VCC (output voltage) decreases below 3.1 V, for example, which is a judgement voltage, discharge of an unshown start capacitor on the power receiving side is started. The start capacitor is a capacitor for starting up the discharging operation (for measurement of a start-up period) on the power receiving side, and is provided as a component external to the receiving side control device 50, for example. When a start-up period TST elapses after the rectified voltage VCC has decreased below the judgement voltage (3.1 V), the discharging operation of the discharging unit 60 is switched from off to on, as shown in C8, and power from the battery 90 starts to be supplied to the power supply target 100. Specifically, when the voltage of the start capacitor (charge voltage) decreases below a threshold voltage for turning on the discharging operation, a start-up period TST is determined to have elapsed, the discharging operation of the discharging unit 60 is turned on, and power from the battery 90 is discharged to the power supply target 100. Accordingly, the electronic apparatus 510 is in a usable state, as shown in A5 in FIG. 3. Also, the power transmission unit 12 starts to perform intermittent power transmission for landing detection, as shown in C9, after normal power transmission is stopped.

In D1 in FIG. 6, the full charge flag is at a high level which is an active level, and the full charge of the battery 90 is detected. When the full charge is detected in this way, the state is shifted to the full charge stand-by state, as shown in A3 in FIG. 3, and the intermittent power transmission for removal detection after full charge is performed, as shown in D2. That is, power transmission is performed during the period TR2 at the intervals of the period TR1. The period TR1 is 1.5 s, for example, and the period TR2 is 50 ms, for example. The period TR1 of the intermittent power transmission for removal detection is shorter than the period TL1 of the intermittent power transmission for landing detection.

The rectified voltage VCC in the power receiving unit 52 increases above 6.0 V due to the intermittent power transmission for removal detection, as shown in D3 and D4 in FIG. 6, and the load modulation is performed as shown in D5 and D6. The fact that the electronic apparatus 510 has not been removed can be detected on the power transmitting side by detecting the load modulation (null communication data or the like).

Also, the interval of the intermittent power transmission period TR1 (1.5 s, for example) for removal detection is shorter than the start-up period TST (3 s, for example) shown in D7 that is set by the aforementioned start capacitor. Therefore, in a state in which the electronic apparatus 510 is not removed, the voltage of the start capacitor (charge voltage) does not decrease below the threshold voltage VT for turning on the discharging operation, and switching from off to on of the discharging operation is not performed, as shown in D8.

On the other hand, the electronic apparatus 510 is removed in D9. The rectified voltage VCC of the power receiving unit 52 decreases below 3.1 V which is the judgement voltage, as shown in D10, after the intermittent power transmission period TR2 for removal detection shown in D4 ends, and therefore measurement of the start-up period TST shown in D7 is started. Then, in D11, the voltage of the start capacitor decreases below the threshold voltage VT for turning on the discharging operation, and the elapse of the start-up period TST is detected. Accordingly, the discharging operation of the discharging unit 60 is switched from off to on, and power from the battery 90 begins to be supplied to the power supply target 100. Also, as shown in D12, intermittent power transmission for landing detection of the electronic apparatus 510 begins to be performed.

Figure 7:
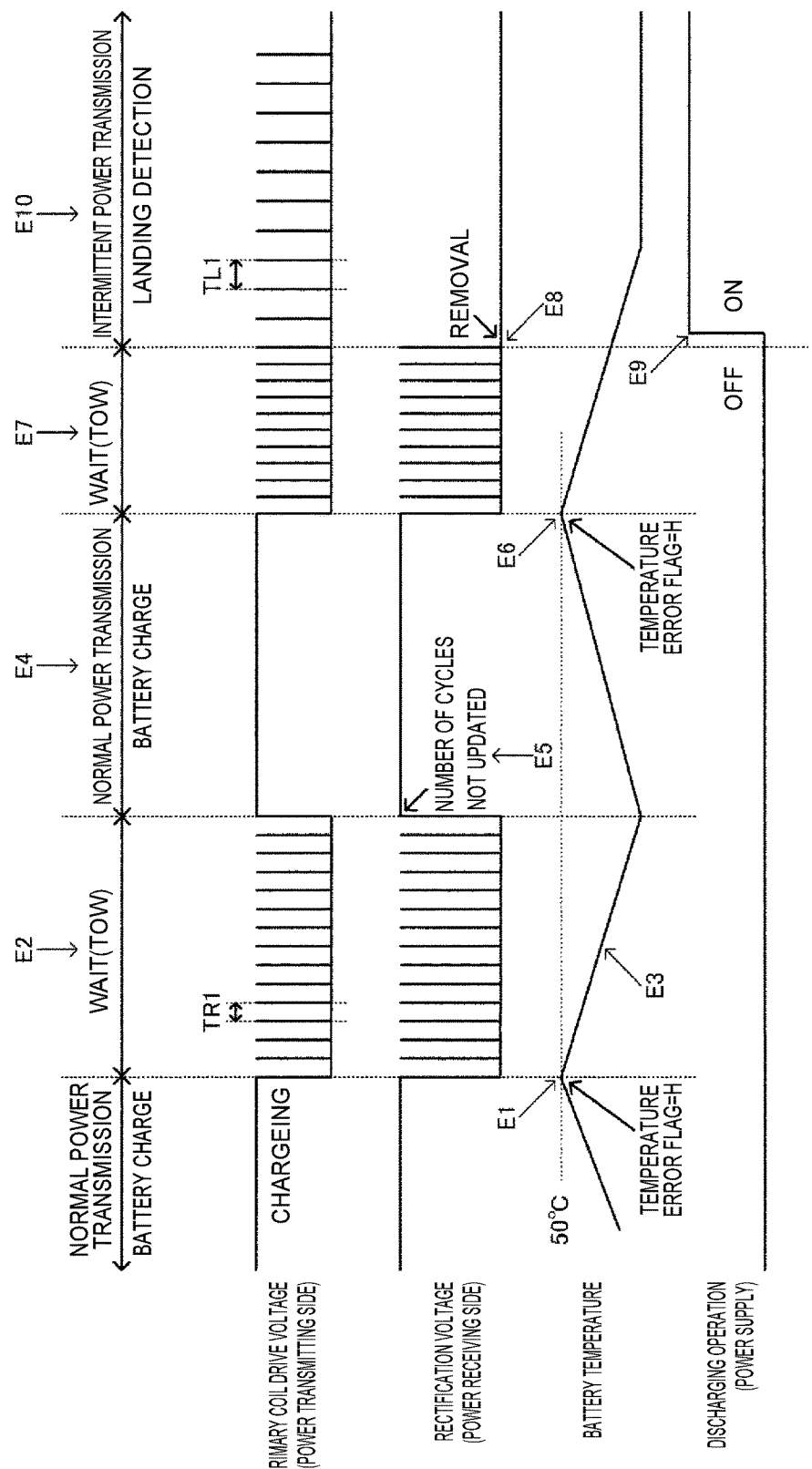
FIG. 7 is a signal waveform diagram for describing an operation sequence of the present embodiment.

FIG. 7 is a signal waveform diagram for describing the operation sequence in an overall wait state due to an abnormal temperature (temperature error).

In E1 in FIG. 7, abnormal temperature (high temperature abnormality) whereby the battery temperature has reached 50° C. is detected, for example, and the temperature error flag is set to a high level, which is an active level. In the present embodiment in this case, an overall waiting period TOW is set as shown in E2. In the waiting period TOW, normal power transmission is suspended, and intermittent power transmission for removal detection is performed, for example. That is, the intermittent power transmission similar to that in the full charge stand-by state described in FIG. 6 is performed. For example, communication data including the temperature error flag is transmitted from the power receiving side by load modulation to the power transmitting side, and therefore normal power transmission of the power transmission unit 12 is suspended, and intermittent power transmission is started.

The length of the waiting period TOW is 5 minutes, for example, normal power transmission which is continuous power transmission is not performed in the waiting period TOW, and the battery 90 is not charged. Accordingly, heat is dissipated from the battery 90, and the battery temperature decreases, as shown in E3 in FIG. 7. Then, when the waiting period TOW has elapsed, normal power transmission is re-started and charging of the battery 90 is re-started, as shown in E4. At this time, in the present embodiment, update processing of the number of cycles that represents the number of charging times is not performed, as shown in E5. That is, because repetition of battery charging caused by an abnormal temperature should not be included in the number of charging times, update processing in which the number of cycles (cycle times) is incremented by 1 is not performed.

In E6 in FIG. 7, the battery temperature again reaches 50° C., and the temperature error flag is set to a high level. Accordingly, the waiting period TOW shown in E7 is set, normal power transmission is suspended, and intermittent power transmission is started to be performed.

In E8 in FIG. 7, the electronic apparatus 510 is removed. When the voltage of the start capacitor described in FIG. 6 decreases below the threshold voltage VT, discharging operation of the discharging unit 60 is switched from off to on, as shown in E9. Then, intermittent power transmission for landing detection by the power transmission unit 12 is performed, as shown in E10.

In the present embodiment as described above, on the condition that the power receiving device 40 has started the load modulation, as shown in B5 in FIG. 4, normal power transmission by the power transmission unit 12 is started, as shown in B6. While the load modulation in B5 continues, the normal power transmission shown in B6 continues. Specifically, as shown in C5 in FIG. 5, in the case where load modulation is not detected any more, normal power transmission by the power transmission unit 12 is stopped as shown in C6. Then, intermittent power transmission for landing detection by the power transmission unit 12 begins to be performed, as shown in C9.

In the present embodiment as described above, an operation sequence is adopted in which normal power transmission is started on the condition that the load modulation has started, the normal power transmission continues while load modulation continues, and the normal power transmission is stopped when the load modulation is not detected any more. In this way, complex authentication processing or the like can be made unnecessary, and contactless power transmission and communication by load modulation can be realized in a simple operation sequence. Also, as a result of performing communication by regular load modulation during a normal power transmission period, effective contactless power transmission according to the state of the power transmission or the like can be realized.

Also, in the present embodiment, as shown in D1 in FIG. 6, in the case where full charge of the battery 90 in the power receiving device 40 is detected based on communication data from the power receiving side, normal power transmission by the power transmission unit 12 is stopped as shown in D2, and intermittent power transmission for removal detection begins to be performed. Then, when the electronic apparatus 510 is removed and the removal is detected as shown in D9, intermittent power transmission for landing detection by the power transmission unit 12 is started, as shown in D12.

In this way, when full charge is detected, normal power transmission which is continuous power transmission is stopped, and intermittent power transmission in which power is intermittently transmitted is started. Accordingly, wasteful power consumption during a removal period or the like can be suppressed, and power saving or the like can be realized.

Also, in the present embodiment, in the case where an abnormality on the power receiving side is detected based on communication data, normal power transmission by the power transmission unit 12 is stopped, and intermittent power transmission for removal detection begins to be performed. The abnormality on the power receiving side is a battery charge error such as battery fail in which the voltage of the battery 90 decreases below 1.0 V, for example, a timer end error of a charging time exceeding a predetermined period (6 to 8 hours, for example), or the like. In this way, in the case where an abnormality on the power receiving side is detected, normal power transmission which is continuous power transmission is automatically stopped, and intermittent power transmission is started, and as a result safety, reliability, and the like can be secured.

Also, in the case where abnormal temperature occurs as an abnormality on the power receiving side as well, normal power transmission by the power transmission unit 12 is suspended, and intermittent power transmission for removal detection is performed. Note that, in the case of abnormal temperature, a special operation sequence as shown in FIG. 7 is executed. Specifically, as shown in E1 in FIG. 7, in the case where abnormal temperature (high temperature error) of the battery 90 in the power receiving device 40 is detected based on communication data (temperature error flag), normal power transmission is suspended, and intermittent power transmission by the power transmission unit 12 is performed during a waiting period TOW as shown in E2. Then, after the waiting period TOW has elapsed, normal power transmission by the power transmission unit 12 is resumed as shown in E4.

In this way, the waiting period TOW is set in the case of abnormal temperature, normal power transmission, which is continuous power transmission, is not performed during the waiting period TOW, and charging of the battery 90 is not performed as well. Accordingly, heat dissipation or the like of the battery 90 is possible using the waiting period TOW. Also, charging of the battery 90 through normal power transmission can be resumed after the waiting period TOW has elapsed. Accordingly, appropriate charging control or the like on the battery 90 under a high temperature environment or the like can be realized, for example.

Also, in the present embodiment, as described in FIGS. 5 and 6, the power receiving device 40 discharges power from the battery 90 to the power supply target 100 after the rectified voltage VCC which is the output voltage of the power receiving unit 52 has decreased and the start-up period TST of the discharging operation has elapsed. Specifically, the discharging operation is started after the start-up period TST has elapsed after the rectified voltage VCC has decreased below the judgement voltage (3.1V). That is, as shown in C8 in FIG. 5 and D11 in FIG. 6, the discharging operation of the discharging unit 60 is turned on, and power from the battery 90 starts to be supplied to a power supply target 100. Also, in the present embodiment, as shown in D2 and D7 in FIG. 6, intermittent power transmission for removal detection is performed at the intervals of period TR1 (1.5 s, for example) that is shorter than the start-up period TST (3 s, for example).

In this way, the start-up period TST does not elapse during the period TR1 for removal detection, and therefore the discharging operation of the discharging unit 60 is not turned on during intermittent power transmission period for removal detection. When the electronic apparatus 510 is removed, as shown in D9 in FIG. 6, the rectified voltage VCC no longer regularly rises as in an intermittent power transmission period for removal detection, and the discharging operation of the discharging unit 60 is turned on, as shown in D11, as a result of the start-up period TST having elapsed as shown in D7. Accordingly, the discharging operation of the discharging unit 60 is automatically turned on as a result of detecting removal of the electronic apparatus 510, and power from the battery 90 can by supplied to the power supply target 100.

4. Power Control Using Switch Unit

In the present embodiment, as described above, the discharging operation of the discharging unit 60 is started with detection of removal of the power receiving device 40 as a trigger. Specifically, the control unit 54 may start the discharging operation of the discharging unit 60 after the start-up period of the discharging operation has elapsed after the output voltage VCC of the power receiving unit 52 has decreased (below the judgement threshold in a narrow sense). The judgement threshold, here, is 3.1 V as described using FIG. 5, for example. Also, the start-up period corresponds to TST in FIG. 5 and the like, and is a period of 3 s, for example.

In the case where such control is performed, the control unit 54 may start a discharging operation of a capacitor that is charged when the power receiving unit 52 receives power, when the output voltage VCC of the power receiving unit 52 has decreased below the judgement threshold, and start the discharging operation of the discharging unit 60 when the voltage of the capacitor becomes less than or equal to the given threshold voltage VT. The capacitor, here, is the start capacitor in FIGS. 5 and 6. This capacitor can be provided as an external component of the control device 50.

As described using FIG. 6, as a result of using the start capacitor, it is possible to stop the discharging operation of the discharging unit 60 while the power transmitting device 10 performs intermittent power transmission. In other words, the control unit 54 stops the discharging operation of the discharging unit 60 in the normal power transmission period. That is, discharging is not started unless removal is performed even after full charge is realized, and therefore power consumption can be reduced. On the other hand, if the charge voltage of the start capacitor decreases below VT, that is, if the power receiving unit 52 does not receive power in the predetermined period TST, the discharging operation of the discharging unit 60 is started, and therefore discharging can be automatically started by removing the power receiving device 40.

Note that, although the detail will be described later, the control unit 54 transmits communication data to the power transmitting device 10 by load modulation performed by the load modulation unit 56 in a normal power transmission period. The normal power transmission period, here, is a period in which power is transmitted in order to charge the battery 90 with the charging unit 58 of the power receiving device 40. Also, the communication data is data that will be described later using FIGS. 17A and 17B, for example, and specifically, is information used for power control in the contactless power transmission system.

The control unit 54 according to the present embodiment may include a charging system control unit and a discharging system control unit. The charging system control unit operates by receiving a voltage based on the output voltage VCC of the power receiving unit 52, and controls units of the charging system. Specifically, the charging system control unit operates by receiving VD5 which will be described later with reference to FIG. 19, and controls the load modulation unit 56, the charging unit 58, the nonvolatile memory 62, and the like. Also, the discharging system control unit operates by receiving a voltage based on the battery voltage VBAT, and controls units of the charging system. Specifically, the discharging system control unit operates by receiving the battery voltage VBAT and controls the discharging unit 60 and the like. Control for starting discharging with removal as a trigger is performed by the discharging system control unit. Also, stop (start) control of discharging based on a switch unit 514, which will be described later, is performed by the discharging system control unit.

Specifically, the control device 50 may include a circuit that outputs a signal that is at a low level when VCC is 3.1 V or more, and is at a high level when VCC is less than 3.1 V. If a reset is performed when the signal is at a low level, and the reset is released when the signal is at a high level, the signal can be used as a power-on reset signal for the charging system control unit, and the circuit can be considered as a power-on reset circuit. Also, the signal may be output to the discharging system control unit, and control of charging and discharging of the start capacitor may be performed in the discharging system control unit based on the signal. As an example, the discharging system control unit may include a circuit that supplies a voltage based on VBAT to the start capacitor for charging when an input signal is at a high level and connects the start capacitor to ground (via a given resistor, for example) for discharging when the input signal is at a low level. Also, the discharging system control unit may control on and off of the discharging unit 60 (charge pump circuit 61) based on the above signal.

However, in the case where the discharging operation is automatically started in this way, power consumption in a situation in which, although removal has been performed, an electronic apparatus 510 including the power receiving device 40 is not in use needs to be considered. Typically, power is consumed in a period (hereinafter referred to as storage period) from when the electronic apparatus 510 is manufactured and shipped until use of the electronic apparatus 510 starts.

From the viewpoint of a user who uses the electronic apparatus 510, it is desirable that the electronic apparatus 510 can be used immediately (without performing charging) after acquiring the electronic apparatus. Therefore, a manufacturer or the like of the electronic apparatus 510 ships the electronic apparatus 510 in a state in which the battery has been charged as much as possible (in a state of full charge, in a narrow sense). However, since the discharging unit 60 of the power receiving device 40 of the present embodiment starts the operation with removal as a trigger, as described above, power of the battery 90 starts to be consumed as well. That is, because power consumption is similar to that during a normal operation, in the case where a large current such as several 10 s mA is output, for example, the power consumption increases, and it is highly possible that charging becomes insufficient during the storage period.

For example, in the case where a 4.2 V lithium-ion battery is used and the storage period is 22 months, the current value needs to be suppressed to approximately 0.2 µA during the storage period in order to not cause the electronic apparatus 510 to become insufficiently charged after the storage period. In the case where the discharging with removal as a trigger is continued, it is very difficult to satisfy this condition.

In a known method, power consumption after shipment is suppressed by taking a measure such as a cell being separately packed or the contact of the cell being isolated by an insulating sheet, and the conditions of the storage period are satisfied. However, in such a method, the number of processes increases, and user-friendliness decreases. Also, there is a problem in that safety needs to be considered in order to handle the cell separately.

Furthermore, the situation in which the electronic apparatus 510 is not used after removal is not limited to the aforementioned storage period. Various situations can be considered in which, although an electronic apparatus 510 is removed from a charger 500, the use of the electronic apparatus 510 is not envisioned such as a situation in which a user takes a long trip and the electronic apparatus 510 is not used during the trip. In this case, it is not preferable to force the user to perform work such as removing the cell or inserting an insulating sheet.

Based on the above, in the present embodiment, an operation mode (later-described off state in FIG. 10) in which power consumption is suppressed is provided, and the transition to the operation mode is performed by an operation that can be easily executed. Specifically, the control device 50 includes a monitoring unit 70 that monitors the operation state of the switch unit 514. The control unit 54 causes the discharging unit 60 to perform the discharging operation when removal of the power receiving device 40 is detected, and stops the discharging operation of the discharging unit 60 when an off operation of the switch unit 514 is detected by the monitoring unit 70.

In this way, even if discharging is started with removal as a trigger, the discharging can be stopped by operating the switch unit 514, and as a result, power consumption can be reduced. In the example described above, the manufacturer or the like of the electronic apparatus 510 ships the electronic apparatus 510 after the off operation of the switch unit 514 has been performed after the battery 90 was fully charged, and as a result, power consumption in a storage period can be reduced even if the storage period is elongated.

Figure 8:
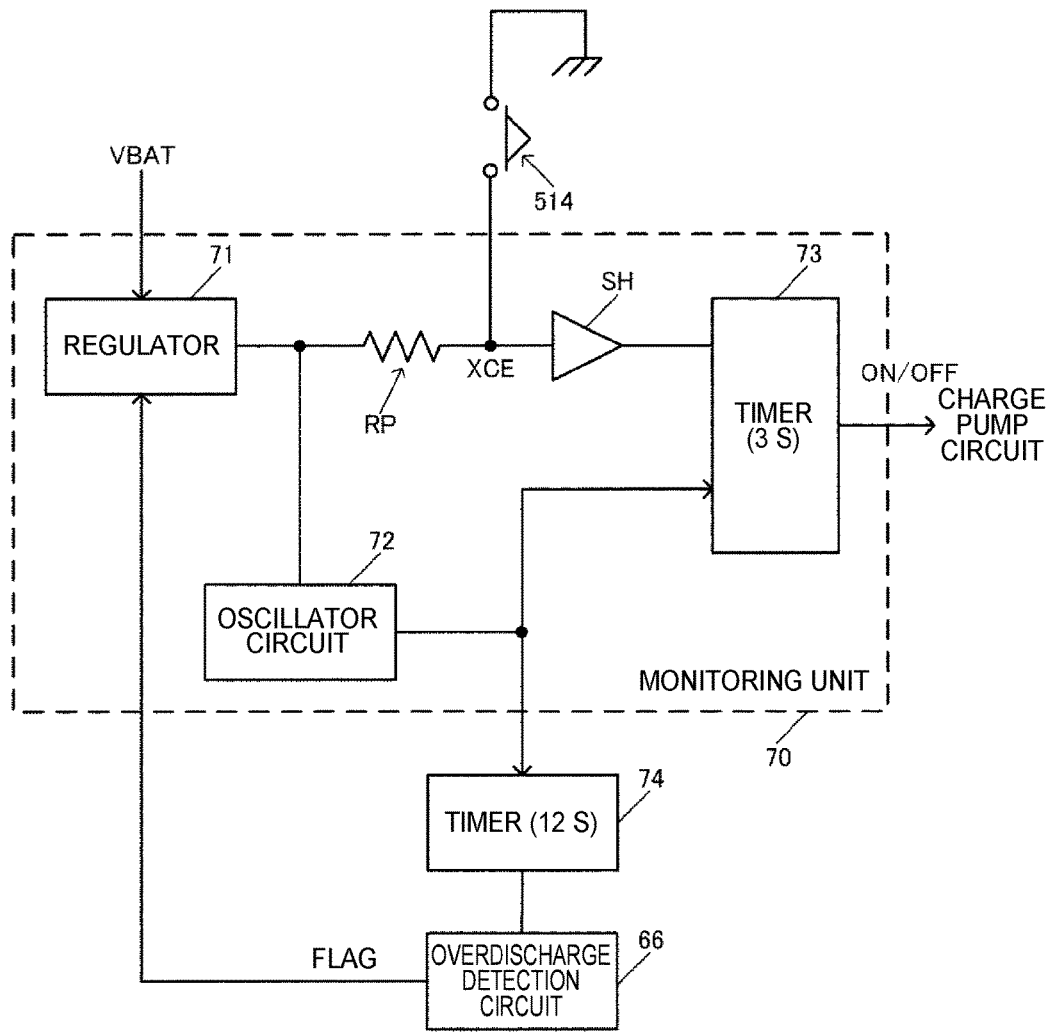
FIG. 8 is a diagram illustrating an exemplary configuration of a monitoring unit.

A specific configuration of the monitoring unit 70 is shown in FIG. 8. The monitoring unit 70 includes a regulator 71, an oscillator circuit 72, a timer 73, a pull-up resistor RP, and a schmitt trigger SH.

The regulator 71 steps down the voltage of the battery 90. For example, the regulator 71 may step down the battery voltage VBAT to 1.3 V. The resistor RP is provided between an output node of the regulator 71 and one end of the switch unit 514. The switch unit 514 is provided on the outside of the control device 50, for example, and one end (node XCE) is connected to the resistor RP and the other end is connected to a given reference potential (ground, as shown in FIG. 8, for example). Various configurations of the switch unit 514 are conceivable. One example is a button, and the button may connect the node XCE and ground while the button is pressed down, and open the connection between the node XCE and ground while the button is not pressed down.

The monitoring unit 70 of the present embodiment judges the operation state of the switch unit 514 based on the voltage at the one end (XCE) of the switch unit 514. Specifically, the monitoring unit 70 judges the operation state of the switch unit 514 based on the measurement result of the timer 73. Here, the oscillator circuit 72 oscillates based on the output voltage of the regulator 71, and can realize low power consumption. The oscillator circuit 72 may be a ring oscillator, as an example. Also, the timer 73 measures the period in which the voltage at the one end (voltage at XCE) is at a first voltage level based on the clock signal from the oscillator circuit 72. As shown in FIG. 8, the timer 73 is connected to the node XCE via the schmitt trigger SH that removes a fluctuation in an input signal, and also receives the clock signal from the oscillator circuit 72.

In the example shown in FIG. 8, when the switch unit 514 is operated and the XCE is grounded, the voltage at the XCE decreases to a low level (first voltage level, ground potential). On the other hand, when the switch unit 514 is not operated, the XCE is disconnected from ground, the voltage at the XCE becomes a high level (second voltage level) based on the output voltage of the regulator 71. That is, the operation state of the switch can be judged based on whether or not the voltage at the one end of the switch unit 514 is the first voltage level.

In this case, by using the oscillator circuit 72 and the timer 73, judgement based on the period in which the XCE is at the first voltage level is enabled. It may be judged that an off operation was performed when the period in which the XCE is at the first voltage level is 3 s or more, for example. In this way, in the case where the switch unit 514 is realized as a button that causes the voltage at the XCE to be the second voltage level when not being pressed down, as described above, whether or not the button is long-pressed can be judged. In this case, the timer 73 measures the period in which the XCE is at the first voltage level, and judges whether or not the period exceeds 3 s. As shown in FIG. 8, when an off operation is detected as a result of measurement by the timer 73, a control signal to turn off the discharging unit 60 (charge pump circuit 61, in a narrow sense) is output.

As a result of judging whether or not a long pressing operation has been performed on the button (performing judgement based on the period of being at the first voltage level, in a broad sense), pressing-down operations for a short period and a long period are judged to be different operation states. Accordingly, the number of types of usable operations can be increased, that is, various inputs can be performed, even with a simple configuration of the switch portion 514. Also, the detection signal SSW does not become an H level through a pressing-down operation for a short period, and thus stoppage of the discharging of the discharging unit 60 due to an erroneous operation can be prevented.

FIG. 9A is a signal waveform diagram for describing an operation sequence based on the operation performed on the switch unit 514. First, as shown in G1, when the rectification voltage reaches a given threshold value (3.1 V) or less, discharging of the start capacitor starts, and as a result of the voltage of the start capacitor decreasing below the threshold voltage VT after a period TST has elapsed as shown in G2, the discharging operation is started as shown in G3. Details are as described above using FIGS. 5 and 6.

Thereafter, in a normal state, the discharging continues until landing is detected or the like. The monitoring unit 70 monitors the operation state of the switch unit 514, and judges whether or not an off operation is performed, as described above. Specifically, the period in which the voltage at the node XCE is at the first voltage level (low level) is measured.

For example, the voltage at the XCE is at the first voltage level in G3 in FIG. 9A, but this voltage level does not continue in a given period (3 s), and returns to the second voltage level. This is a case in which the duration of pressing down of the button is less than 3 s. In this case, the operation is not recognized as the off operation, and as a result, the discharging operation continues, as shown in FIG. 9A.

On the other hand, in G4, the period in which the voltage at the XCE is at the first voltage level continues for the given period (3 s). Therefore, the monitoring unit 70 judges that the off operation has been performed, and the discharging operation of the discharging unit 60 operation is stopped, as shown in G5.

In the case where the off operation is performed and the discharging operation is stopped, various modifications can be implemented as to what trigger is used to restart the discharging operation. For example, the removal may be used as the trigger, as shown in FIG. 5 and the like. In this case, since the discharging stop by the off operation of the switch unit 514 is assumed to be performed in the removed state, the power receiving device 40 (electronic apparatus 510) is once landed on the power transmitting device 10 (charger 500), and thereafter, removal is performed. In this case, landing that is not aimed at charging (landing for only starting discharging) is needed, and it may be troublesome for the user. Therefore, the discharging operation may be restarted by an on operation using the switch unit 514 in a state in which the off operation has been performed and the discharging operation has stopped.

Specifically, the control unit 54 starts the discharging of the discharging unit 60 when the monitoring unit 70 detects the on operation of the switch unit 514 after the discharging of the discharging unit 60 has stopped. The on operation, here, may be a similar operation to the off operation, or a different operation. The on operation may be detected when the period in which the voltage at the node XCE is at the first voltage level (low level) continues for a predetermined period, similarly to the off operation, as an example.

In G6 in FIG. 9A, in a state in which the discharging operation is stopped, the period in which the voltage at the node XCE is at a low level continues for 3 s. Then, the monitoring unit 70 judges this operation of the switch unit 514 as the on operation, and the control unit 54 restarts the discharging operation of the discharging unit 60, as shown in G7.

As described above, in the present embodiment, since the discharging operation can be stopped by operating of the switch unit 514, even in a case where discharging is automatically started with removal as a trigger, power consumption after removal can be reduced. However, even though the power consumption is reduced, the power consumption does not become completely 0, and the battery voltage VBAT decreases over time. Therefore, even if the above method is adopted, it is possible that the battery 90 is overdischarged.

Then, if the secondary battery is overdischarged, it is difficult to reuse the secondary battery. Therefore, it is highly necessary to perform overdischarge detection to detect a state in which the battery voltage has decreased to a level before entering overdischarge (overdischarged state) in order to suppress damage to the battery 90.

The control device 50 (detection unit 64, in a narrow sense) of the present embodiment may include an overdischarge detection circuit 66 that detects the overdischarged state of the battery 90. Here, considering that the overdischarge detection is performed with low power consumption, an oscillator circuit that operates at a low voltage may be used as the oscillator circuit that supplies a clock signal to the timer 74 that determines an operation timing of the overdischarge detection circuit.

Therefore, the oscillator circuit 72 that outputs a clock signal to the timer 73 is also used for the timer 74 for operating the overdischarge detection circuit 66, as an example. Specifically, as shown in FIG. 8, the oscillator circuit 72 outputs the clock signal to the timer 74. The timer 74 is connected to the overdischarge detection circuit 66, and causes the overdischarge detection circuit 66 to operate at a predetermined interval by performing measurement based on the clock signal. For example, if the overdischarge detection circuit 66 is operated at an interval of 12 s, the timer 74 is a timer for measuring 12 s. Note that the operating rate of the overdischarge detection circuit 66 is not limited to once every 12 s, and may be a different rate such as once every 15 s.

Then, when the overdischarged state is detected by the overdischarge detection circuit 66, the units of the control device 50 are stopped as long as possible in order to suppress damage to the battery 90. For example, in a state of not being in the overdischarged state, the overdischarge detection circuit 66 and the regulator 71, the oscillator circuit 72, the timer 74, and the like that need to be operated for the overdischarge detection circuit 66 to operate need to be operated regardless of whether the discharging operation is turned on or off. After the overdischarged state is detected, these operations are stopped. Also, as shown in G6, G7 in FIG. 9A, in the case where the restart of the discharging operation is performed by the operation of the switch unit 514, the timer 73 needs to be operated even in the off state, but this operation may be stopped in the overdischarged state.

That is, when the overdischarged state is detected by the overdischarge detection circuit 66, the monitoring unit 70 stops operating. In this way, power consumption after detecting the overdischarged state can be made very low, and therefore the possibility of damage to the battery 90 can be suppressed. Specifically, when the overdischarged state is detected, the overdischarge detection circuit 66 may output flag information for causing the operation of the regulator 71 to stop, as shown in FIG. 8. When the regulator 71 stops, power is no longer supplied to the oscillator circuit 72 and the like, and as a result, the monitoring unit 70 stops operation.

Figure 10:
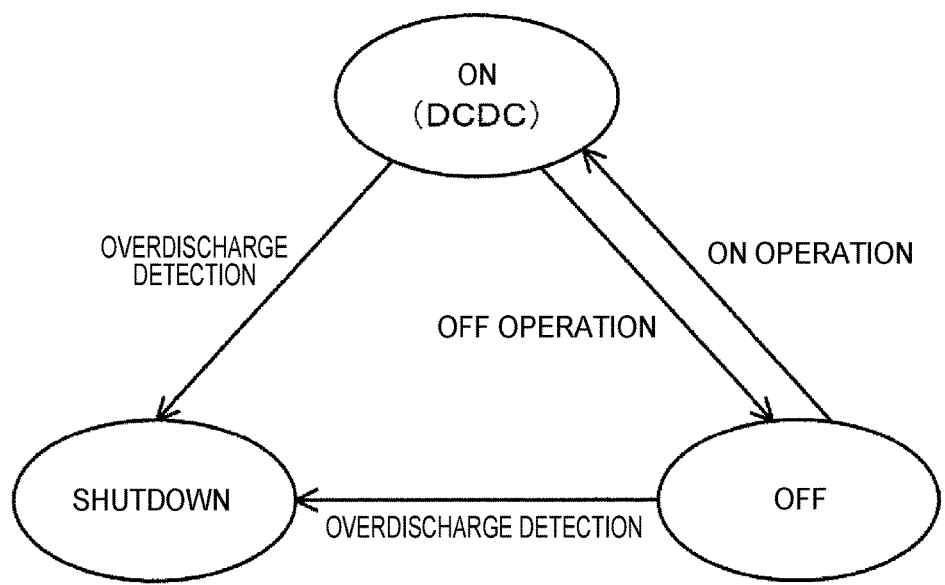
FIG. 10 is a state transition diagram after a power receiving device has been removed.

A state transition diagram illustrating operating states of the control device 50 after the power receiving device 40 has been removed is shown in FIG. 10. The control device 50 takes any of an on state in which a DCDC circuit (discharging unit 60) performs the discharging operation, an off state in which the discharging operation is stopped, and a shutdown state corresponding to a state after overdischarge is detected.

The on state is a normal operation state, and the on state is entered first after discharging is started with removal as a trigger. When the off operation of the switch unit 514 described above is performed in the on state, the state transitions to the off state. Also, when the on operation of the switch unit 514 described above is performed in the off state, the state transitions to the on state. That is, the on state and the off state are in a relation of mutual transition under the condition of the monitoring unit 70 detecting the off operation or the on operation of the switch unit 514.

On the other hand, the overdischarge detection circuit 66 operates in both the on state and the off state, as described above. Then, in the case where the overdischarged state is detected in the on state or the case where the overdischarged state is detected in the off state, the state transitions to the shutdown state. In the shutdown state, not only the discharging operation of the discharging unit 60, but also the monitoring unit 70 stops operating. When the shutdown state is entered, operating the circuits that have been stopped is not assumed unless charging of the battery 90 is performed, and therefore direct transition from the shutdown state to the on state or the off state is not described in FIG. 10.

Note that description has been given using a button that sets the voltage at the XCE to a low level only while the button is being pressed down, as an example of the switch unit 514, but the configuration of the switch unit 514 is not limited thereto. For example, the switch unit 514 may be realized as a switch that can take a plurality of states such as a toggle switch. When the toggle switch is in a first state, the XCE may be grounded, and when the toggle switch is in a second state, the XCE may be disconnected from ground.

In the case where the toggle switch is used, if the switch is set to the first state (second state), the state in which the voltage at the XCE is at a low level (high level) continues even if the user does not continue any switching operation, and therefore it is difficult to envision an operation such as long pressing described above. Therefore, the monitoring unit 70 may not perform measurement using the timer 73, and judge the operation state of the switch unit 514 based on the voltage at the XCE. An operation to set the voltage level at the XCE to a low level may be judged as the on operation, and an operation to set the voltage level to a high level may be judged as the off operation, for an example. In this example, an operation to set the toggle switch to the first state is the on operation, and an operation to set to the second state is the off operation. Note that various modifications can be implemented such as reversing the relationship between the voltage level at the XCE and the on and off operations.

FIG. 9B is a signal waveform diagram for describing an operation sequence based on the operation performed on the switch unit 514 in the case where a toggle switch or the like is used. H1 to H3 shows the start of the discharging operation with removal as a trigger, similarly to G1 to G3 in FIG. 9A.

In FIG. 9B, it is assumed that the switch unit 514 is in the first state at the time of removal, and the voltage at the XCE is at a low level. When an operation to set the switch unit 514 to the second state is performed, the voltage at the XCE becomes a high level, as shown in H4, and as a result, the monitoring unit 70 detects the off operation, and the control unit 54 stops the discharging operation, as shown in H5.

On the other hand, when an operation to set the switch unit 514 to the first state is performed, the voltage at the XCE becomes a low level, as shown in H6, and as a result, the monitoring unit 70 detects the on operation, and the control unit 54 starts (restarts) the discharging operation, as shown in H5.

As shown in FIGS. 9A and 9B, when the operation state of the switch unit 514 is detected by the monitoring unit 70, the duration of being at a given voltage level may be used, or the voltage level may be simply used, furthermore, another method with which transition between the on state and the off state can be identified may be used. Also, various modifications can be implemented as to the physical (mechanical) configuration of the switch unit 514 in order to realize the control shown in FIGS. 9A and 9B.

Also, the method of the present embodiment can be applied to an electronic apparatus including the control device 50. The electronic apparatus 510 including the control device 50 can be considered in various modes including a hearing aid and the like as described above.

Also, the method of the present embodiment can be applied to the contactless power transmission system including the power transmitting device 10 and the power receiving device 40 as described above. The power transmitting device 10 transmits power to the power receiving device 40, and performs communication processing with the power receiving device 40 that transmits communication data by load modulation. The power receiving device 40 charges the battery 90 based on the power received from the power transmitting device 10, transmits communication data to the power transmitting device 10 by load modulation, supplies power from the battery 90 to the supply target 100 by performing the discharging operation of the battery 90, and monitors the operation state of the switch unit 514. Also, the power receiving device 40 discharges the battery 90 when removal of the power receiving device 40 is detected, and stops discharging of the battery 90 when the off operation of the switch unit 514 is detected.

5. Communication Method

Figure 11:
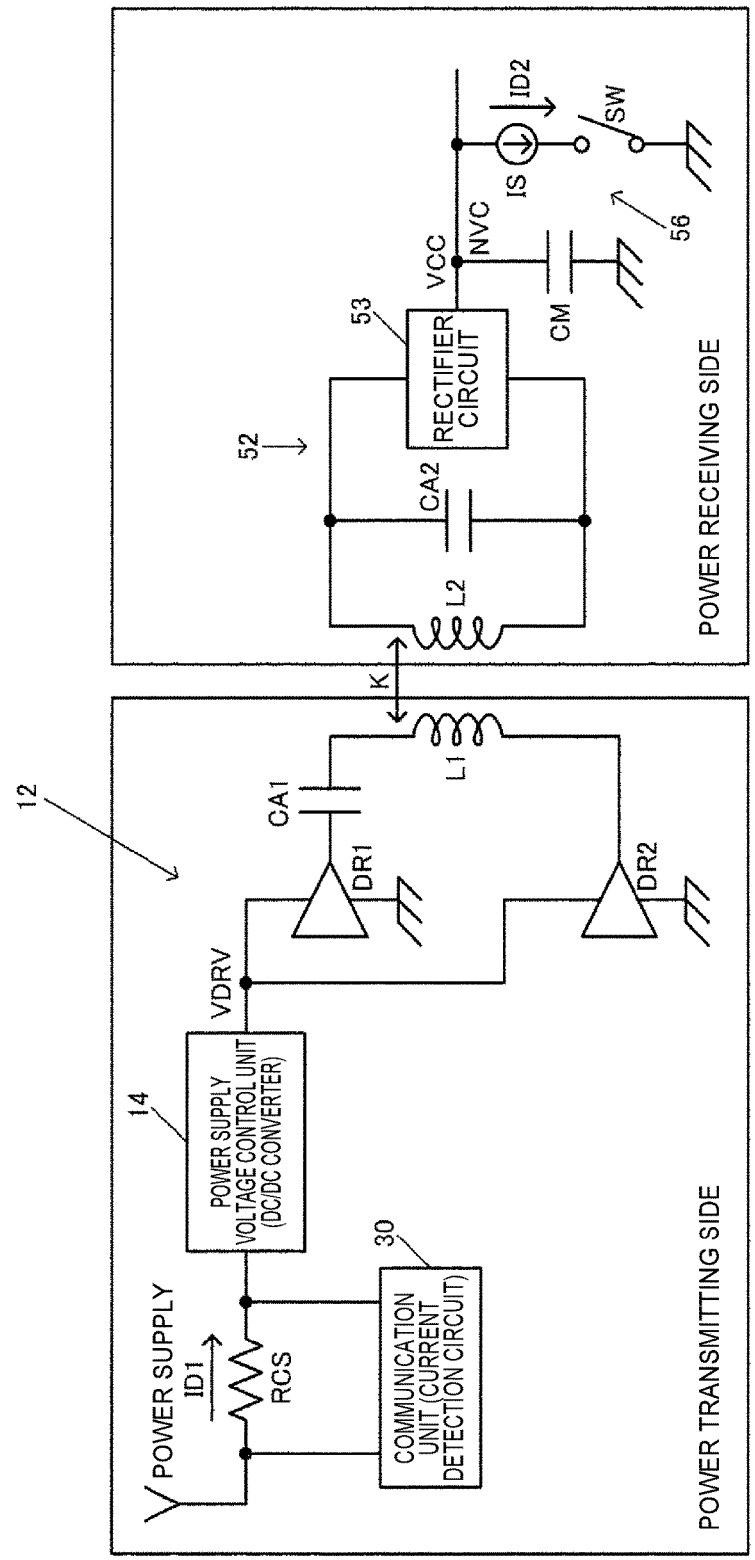
FIG. 11 is a diagram for describing a communication method by load modulation.

FIG. 11 is a diagram for describing an example of the method of communication by load modulation. The power transmission drivers DR1 and DR2 in the power transmission unit 12 drive the primary coil L1 on the power transmitting side (primary side), as shown in FIG. 11. Specifically, the power transmission drivers DR1 and DR2 operate based on the power supply voltage VDRV supplied from the power supply voltage control unit 14 and drive the primary coil L1.

On the other hand, on the power receiving side (secondary side), the coil end voltage of the secondary coil L2 is rectified by the rectifier circuit 53 in the power receiving unit 52, and a rectified voltage VCC is output to the node NVC. Note that the primary coil L1 and a capacitor CA1 constitute a resonance circuit on the power transmitting side, and the secondary coil L2 and the capacitor CA2 constitute a resonance circuit on the power receiving side.

On the power receiving side, a current ID2 of the current source IS is caused to intermittently flow from the node NVC to the GND side by turning on and off the switching element SW in the load modulation unit 56, and thereby the load state on the power receiving side (power receiving side voltage) is changed.

On the power transmitting side, a current ID1 that flows in a sense resistor RCS provided in a power supply line changes due to the change of the load state on the power receiving side caused by load modulation. For example, the sense resistor RCS for detecting the current that flows in a power supply is provided between the power supply (power supply device such as the power supply adapter 502 shown in FIG. 1A, for example) on the power transmitting side and the power supply voltage control unit 14. A power supply voltage is supplied from the power supply to the power supply voltage control unit 14 via the sense resistor RCS. A current ID1 that flows from the power supply to the sense resistor RCS changes due to the change of the load state on the power receiving side caused by load modulation, and the communication unit 30 detects the change in the current. Then, the communication unit 30 performs a detection operation for detecting communication data that is transmitted by load modulation based on the detection result.

Figure 12:
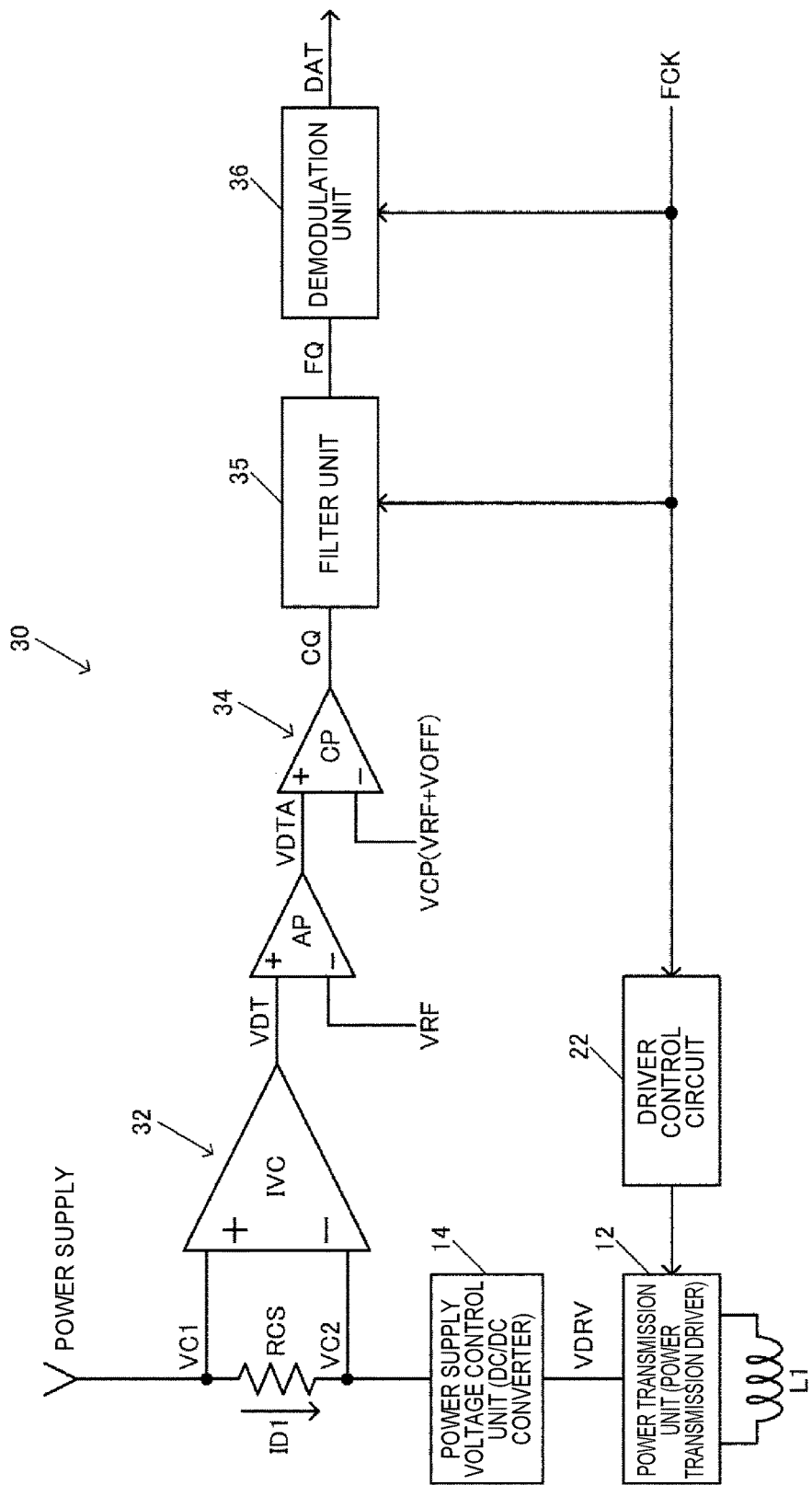
FIG. 12 is a diagram illustrating an exemplary configuration of a communication unit.

An example of the specific configuration of the communication unit 30 is shown in FIG. 12. The communication unit 30 includes a current detection circuit 32, a comparator circuit 34, and a demodulation unit 36, as shown in FIG. 12. Also, the communication unit 30 can include an amplifier AP for signal amplification and a filter unit 35. Note that the communication unit 30 is not limited to the configuration in FIG. 12, and various modifications can be implemented such as omitting a portion of the constituent elements, adding another constituent element (bandpass filter unit, for example), or changing connection relationships.

The current detection circuit 32 detects the current ID1 that flows from the power supply (power supply device) to the power transmission unit 12. Specifically, the current detection circuit 32 detects the current ID1 that flows from the power supply to the power transmission unit 12 via the power supply voltage control unit 14. The current ID1 may include a current that flows in the driver control circuit 22 and the like, for example.

In FIG. 12, the current detection circuit 32 is constituted by an IV conversion amplifier IVC. A non-inverting input terminal (+) of the IV conversion amplifier IVC is connected to one end of the sense resistor RCS, and an inverting input terminal (−) thereof is connected to the other end of the sense resistor RCS. The IV conversion amplifier IVC amplifies a minute voltage VC1-VC2 that is generated by the minute current ID1 that flows in the sense resistor RCS, and outputs the amplified voltage as the detection voltage VDT. The detection voltage VDT is further amplified by the amplifier AP, and the amplified voltage is output to the comparator circuit 34 as a detection voltage VDTA. Specifically, the detection voltage VDT is input to a non-inverting input terminal of the amplifier AP, and a reference voltage VRF is input to an inverting input terminal thereof, and the amplifier AP outputs the detection voltage VDTA signal that has been amplified with reference to the reference voltage VRF.

The comparator circuit 34 compares the detection voltage VDTA by the current detection circuit 32 with a judgement voltage VCP=VRF+VOFF. Then, the comparator circuit 34 outputs a comparison result CQ. For example, the comparator circuit 34 performs comparison to judge whether the detection voltage VDTA exceeds the judgement voltage VCP or is lower than the judgement voltage VCP. The comparator circuit 34 can be constituted by a comparator CP, for example. In this case, the voltage VOFF of the judgement voltage VCP=VRF+VOFF may be realized by an offset voltage of the comparator CP, or the like.

The demodulation unit 36 determines a load modulation pattern based on the comparison result CQ (comparison result FQ after filtering processing) of the comparator circuit 34. That is, communication data is detected by performing demodulation processing with the load modulation pattern, and is output as detection data DAT. The control unit 24 on the power transmitting side performs various types of processing based on the detection data DAT.

Note that, in FIG. 12, the filter unit 35 is provided between the comparator circuit 34 and the demodulation unit 36. The demodulation unit 36 determines the load modulation pattern based on the comparison result FQ after filtering processing by the filter unit 35. Although a digital filter or the like can be used as the filter unit 35, for example, a passive filter may be used as the filter unit 35. By providing the filter unit 35, adverse effects from noise in later-described F1 and F2 in FIG. 14, for example, can be reduced.

The filter unit 35 and the demodulation unit 36 operate with receiving a drive clock signal FCK, for example. The drive clock signal FCK is a signal for defining a power transmission frequency, and the driver control circuit 22 drives the power transmission drivers DR1 and DR2 in the power transmission unit 12 with receiving the drive clock signal FCK. The primary coil L1 is driven at a frequency (power transmission frequency) defined by the drive clock signal FCK.

Note that a bandpass filter unit that performs bandpass filtering processing in which a signal in a load modulation frequency band is allowed to pass, and signals in bands other than the load modulation frequency band are attenuated may be provided in the communication unit 30. In this case, the communication unit 30 detects communication data from the power receiving device 40 based on the output of the bandpass filter unit. Specifically, the bandpass filter unit performs bandpass filtering processing on the detection voltage VDT of the current detection circuit 32. The comparator circuit 34 compares the detection voltage VDTA after bandpass filtering processing by the bandpass filter unit and the judgement voltage VCP. The bandpass filter unit may be provided between the IV conversion amplifier IVC and the amplifier AP.

Figure 13:
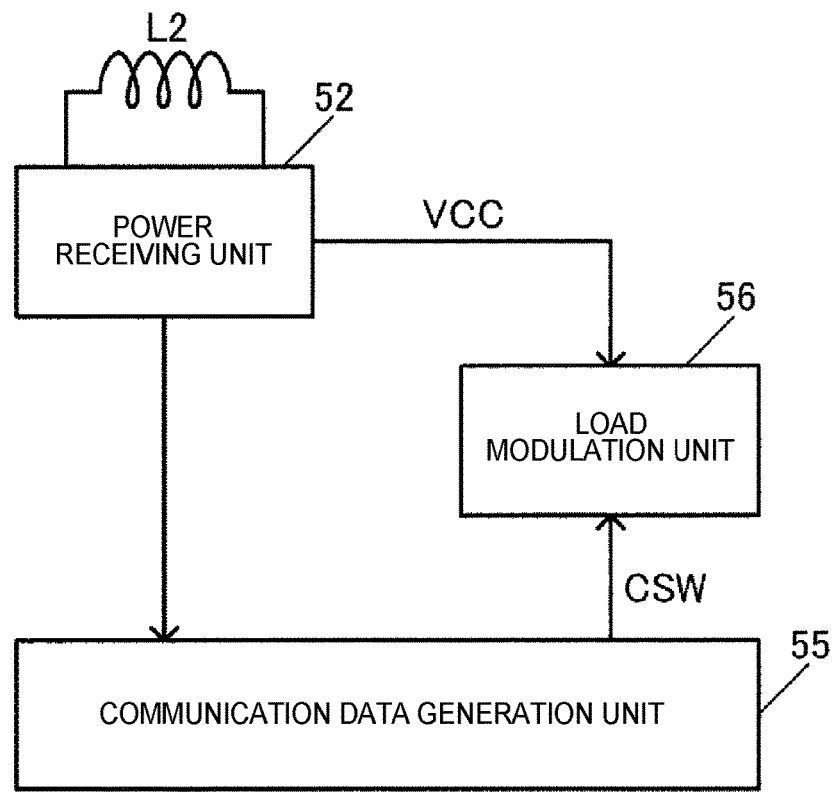
FIG. 13 is a diagram for describing a communication configuration on a power receiving side.

FIG. 13 is a diagram for describing a communication configuration on the power receiving side, for example. The power receiving unit 52 extracts a clock signal having a frequency corresponding to the drive clock signal FCK, and supplies the extracted signal to the communication data generation unit 55. The communication data generation unit 55 is provided in the control unit 54 in FIG. 2, and performs processing for generating communication data based on the supplied clock signal. The communication data generation unit 55 outputs a control signal CSW for transmitting the generated communication data to the load modulation unit 56, and causes the load modulation unit 56 to perform load modulation corresponding to the communication data by performing turning on and off the switching element SW, for example, with the control signal CSW.

The load modulation unit 56 performs load modulation by changing the load state (load due to load modulation) on the power receiving side to states such as a first load state and a second load state, for example. The first load state is a state in which the switching element SW is turned on, for example, and is a state in which the load state (load in load modulation) on the power receiving side is a high load (low impedance). The second load state is a state in which the switching element SW is turned off, for example, and is a state in which the load state (load in load modulation) on the power receiving side is a low load (high impedance).

In the load modulation method so far, communication data is transmitted from the power receiving side to the power transmitting side by associating the first load state with a logic level "1" (first logic level) of the communication data and associating the second load state with a logic level "0" (second logic level) of the communication data. That is, communication data having a predetermined number of bits has been transmitted by turning on the switching element SW if the logic level of a bit in the communication data is "1", and by turning off the switching element SW if the logic level of the bit in the communication data is "0".

However, in an application in which the coupling degree between the coils is small, the coils are small, or transmitting power is also small, for example, realization of adequate communication is difficult with such a known load modulation method. That is, even if the load state of the power receiving side is changed by load modulation to the states such as the first load state and the second load state, data detection error in logic levels "1" and "0" in the communication data occurs due to noise. That is, even if load modulation is performed on the power receiving side, the current ID1 that flows in the sense resistor RCS on the power transmitting side due to this load modulation becomes a very minute current. Therefore, if noise is superimposed, a data detection error occurs, and a communication error due to noise or the like occurs.

Figure 14:
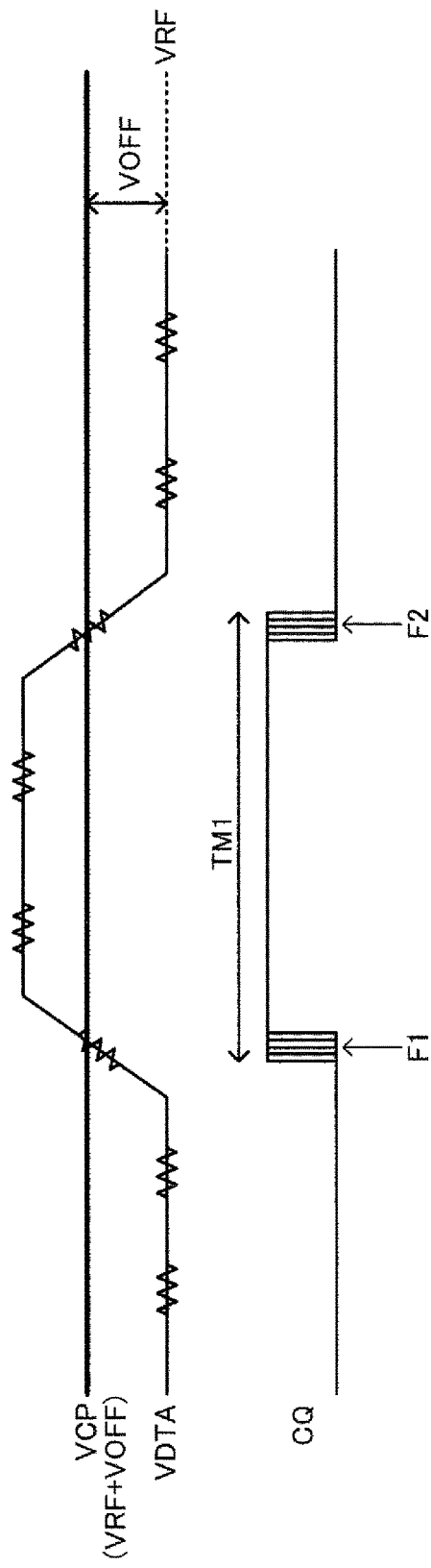
FIG. 14 is a diagram for describing a problem caused by noise when communication is performed.

For example, FIG. 14 is a diagram schematically illustrating signal waveforms of the detection voltage VDTA, the judgement voltage VCP and the comparison judgement result CQ of the comparator circuit 34. As shown in FIG. 14, the detection voltage VDTA is a voltage signal that changes relative to the reference voltage VRF, and the judgement voltage VCP is a voltage signal in which the offset voltage VOFF of the comparator CP is added to the reference voltage VRF.

As shown in FIG. 14, when noise is superimposed on the detection voltage VDTA signal, for example, edge positions of the comparison result CQ signal change as illustrated in F1 and F2, and the width (interval) of a period TM1 changes so as to increase or decrease. For example, assuming that the period TM1 is a period corresponding to the logic level "1", if the width of the period TM1 changes, a sampling error of the communication data occurs, and a communication data detection error occurs. Specifically, in the case where communication is performed by regular load modulation in a normal power transmission period, an amount of noise that is superimposed on the communication data may be increased, and the probability of occurrence of the communication data detection error increases.

In the present embodiment, a method is adopted in which the logic level "1" (data 1) or the logic level "0" (data 0) of each bit in the communication data is transmitted from the power receiving side using a load modulation pattern, and is detected on the power transmitting side.

Specifically, as shown in FIG. 15, the load modulation unit 56 on the power receiving side performs load modulation such that the load modulation pattern is a first pattern PT1 for a first logic level "1" of the communication data that is transmitted to the power transmitting device 10. On the other hand, the load modulation unit 56 on the power receiving side performs load modulation such that the load modulation pattern is a second pattern PT2 that is different from the first pattern PT1 for a second logic level "0" of the communication data.

The communication unit 30 (demodulation unit) on the power transmitting side determines that the communication data is communication data of the first logic level "1" if the load modulation pattern is the first pattern PT1. On the other hand, the communication unit 30 determines that the communication data is communication data of the second logic level "0" if the load modulation pattern is the second pattern PT2 that is different from the first pattern PT1.

Here, the load modulation pattern is a pattern constituted by the first load state and the second load state. The first load state is a state in which the load on the power receiving side set by the load modulation unit 56 is a high load, for example. Specifically, in FIG. 15, a period TM1 in the first load state is a period in which the switching element SW in the load modulation unit 56 is turned on and current of the current source IS flows from the node NVC to the GND side, and is a period corresponding to a high level (bit=1) in the first and second patterns PT1 and PT2.

On the other hand, the second load state is a state where the load on the power receiving side set by the load modulation unit 56 is a low load, for example. Specifically, in FIG. 15, a period TM2 in the second load state is a period in which the switching element SW in the load modulation unit 56 is turned off, and is a period corresponding to a low level (bit=0) in the first and second patterns PT1 and PT2.

In FIG. 15, the first pattern PT1 is a pattern in which the width of period TM1 in the first load state is longer than that in the second pattern PT2. The first pattern PT1 in which the width of period TM1 in the first load state is longer than that in the second pattern PT2 is determined to be the logic level "1". On the other hand, the second pattern PT2 in which the width of period TM1 in the first load state is shorter than that in the first pattern PT1 is determined to be the logic level "0".

As shown in FIG. 15, the first pattern PT1 is a pattern corresponding to a bit pattern (1110), for example. The second pattern PT2 is a pattern corresponding to a bit pattern (1010), for example. In these bit patterns, bit=1 corresponds to a state in which the switching element SW in the load modulation unit 56 is turned on, and bit=0 corresponds to a state in which the switching element SW in the load modulation unit 56 is turned off.

For example, in the case where the bit in transmitting communication data is a logic level "1", the switching element SW in the load modulation unit 56 is turned on and off, on the power receiving side, with a bit pattern (1110) that corresponds to the first pattern PT1. Specifically, switching control in which the switching element SW is sequentially turned on, on, on, and off is performed. Then, in the case where the load modulation pattern is the first pattern PT1 that corresponds to the bit pattern (1110), the logic level of the bit in the communication data is determined, on the power transmitting side, to be "1".

On the other hand, in the case where the bit in transmitting communication data is a logic level "0", the switching element SW in the load modulation unit 56 is turned on and off, on the power receiving side, with a bit pattern (1010) that corresponds to the second pattern PT2. Specifically, switching control in which the switching element SW is sequentially turns on, off, on, and off is performed. Then, in the case where the load modulation pattern is the second pattern PT2 that corresponds to the bit pattern (1010), the logic level of the bit in the communication data is determined, on the power transmitting side, to be "0".

Here, in the case where the drive frequency in the power transmission unit 12 is FCK, and the drive cycle is T=1/FCK, the length of each of the first and second patterns PT1 and PT2 is expressed as 512×T, for example. In this case, the length of one bit section can be expressed as (512×T)/4=128×T. Accordingly, in the case where the bit in the communication data is in a logic level "1", the switching element SW in the load modulation unit 56 is turned on and off, on the power receiving side, in the bit pattern (1110) that corresponds to the first pattern PT1 in an interval 128×T, for example. Also, in the case where the bit in the communication data is in a logic level "0", the switching element SW in the load modulation unit 56 is turned on and off, on the power receiving side, in the bit pattern (1010) that corresponds to the second pattern PT2 in the interval 128×T, for example.

Figure 16:
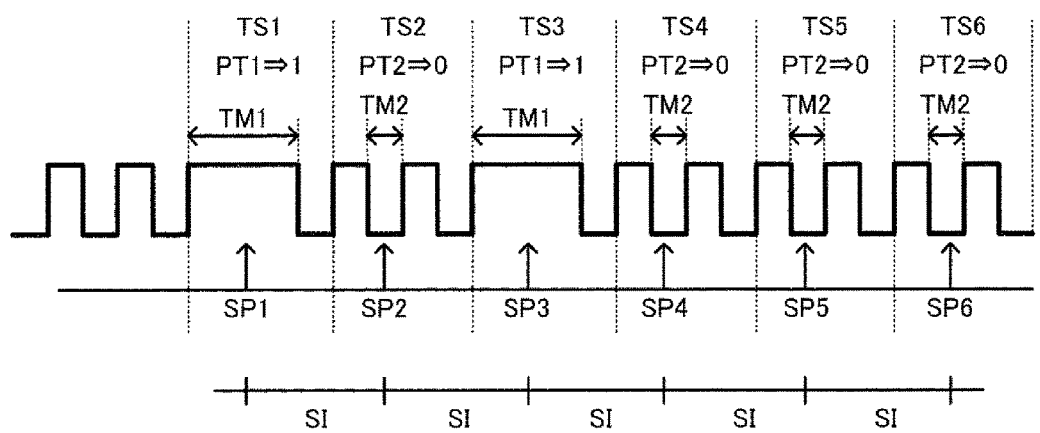
FIG. 16 is a diagram for describing the communication method of the present embodiment.

On the other hand, a detection operation and fetching processing for communication data are performed on the power transmitting side by a method shown in FIG. 16, for example. For example, the communication unit 30 (demodulation unit) performs sampling on the load modulation pattern from a first sampling point SP1 that is set in the period TM1 in the first load state in the first pattern PT1 at given sampling intervals SI and takes in communication data of a given number of bits.

For example, sampling points SP1, SP2, SP3, SP4, SP5, and SP6 in FIG. 16 are sampling points that are set at sampling intervals SI. The sampling interval SI is an interval that corresponds to the length of the load modulation pattern. That is, the sampling interval SI is an interval that corresponds to the length of each of the first and second patterns PT1 and PT2 that are load modulation patterns. For example, in FIG. 15, the length of each of the first and second patterns PT1 and PT2 is 512×T (=512/FCK), and therefore the length of the sampling interval SI is also 512×T.

In FIG. 16, the load modulation patterns in the periods TS1, TS2, TS3, TS4, TS5, and TS6 are respectively PT1, PT2, PT1, PT2, PT2, and PT2. Here, the periods TS1, TS2, TS3, TS4, TS5, and TS6 are periods that respectively correspond to the sampling points SP1, SP2, SP3, SP4, SP5, and SP6. Accordingly, in the case shown in FIG. 16, communication data (101000) having a number of bits=6, for example, is taken in by performing sampling on the load modulation pattern from the first sampling point SP1 at the sampling intervals SI.

Specifically, the communication unit 30 detects a pulse whose signal level is a high level, and performs bit synchronization in the case where the pulse width is less than a first range width (220×T to 511×T, for example). Then, in the case where the bit synchronization is achieved, the first sampling point SP1 is set at the center point of the pulse width, and signals are taken in at the sampling intervals SI (512×T, for example) from the first sampling point SP1. The logic level is determined to be a logic level "1" (first pattern PT1) if the level of the signal that is taken in is a high level, and the logic level is determined to be a logic level "0" (second pattern PT2) if the level of the signal that is taken in is a low level. In this way, in FIG. 16, communication data (101000) is taken in. In actuality, by taking in data in an amount of 15 bits after the bit synchronization (after data of 1 bit is taken in in SP1), overall communication data of an amount of 16 bits is taken in. In this 16 bit communication data, the first 1 bit (the bit with which bit synchronization is achieved) is always "1".

In the present embodiment, as described above, in the case where the width of the period TM1 in the first load state is less than the first range width (220×T to 511×T), the first sampling point SP1 is set within the period TM1 of the first load state, as shown in FIG. 16. That is, in the case where the width of the period TM1 in which the signal level is at a high level is less than the first range width, bit synchronization is performed, and the first sampling point SP1 is set at the center point, for example, of the period TM1. Then, sampling is performed at the sampling intervals SI from the set first sampling point SP1. Here, the first range width (220×T to 511×T) is a range width that is set corresponding to the period TM1 (384×T) in the first load state in the first pattern PT1.

That is, as described in FIG. 14, the width of the period TM1 changes due to noise or the like. A typical value of the width of the period TM1 in the first pattern PT1 is a width 128×3×T=384×T that corresponds to an amount of 3 bits (111). Accordingly, the first range width (220×T to 511×T) is set so as to include this 384×T. The period at a high level that is less than the first range width (220×T to 511×T) is determined to be the period TM1 in the first pattern PT1, and bit synchronization for setting the first sampling point SP1 is performed. In this way, even in the case where noise is superimposed on the signal, as shown in FIG. 14, an adequate first sampling point SP1 can be set by performing adequate bit synchronization.

After setting the first sampling point SP1, sampling is performed at the sampling intervals SI, and either the first or second patterns PT1 and PT2 is determined based on the signal level at each sampling point. That is, the communication unit 30 determines that the load modulation pattern at the second sampling point SP2 is the first pattern PT1 in the case where the load state is the first load state (in the case where the signal level is at a high level) at the second sampling point SP2 which is next to the first sampling point SP1. That is, the communication unit 30 determines that the logic level of the bit in the communication data is "1".

On the other hand, the communication unit 30 determines that the load modulation pattern at the second sampling point SP2 is the second pattern PT2 in the case where the load state is the second load state (in the case where the signal level is in the low level) at the second sampling point SP2. That is, the communication unit 30 determines that the logic level of the bit in the communication data is "0". The same is applied to the sampling points thereafter.

For example, in FIG. 16, the load state at the sampling point SP2 is the second load state (low level), and therefore the load modulation pattern is determined to be the second pattern PT2, and the logic level is determined to be "0". Since the load state at the sampling point SP3 is the first load state (high level), the load modulation pattern is determined to be the first pattern PT1, and the logic level is determined to be "1". Since the load states at the sampling points SP4, SP5, and SP6 are the second load state (low level), the load modulation patterns are determined to be the second pattern PT2, and the logic levels are determined to be "0".

Note that, at each of the sampling points SP2 to SP6 in FIG. 16, the width of the load state period that includes the sampling point may be verified to be in a predetermined range width.

For example, in the case where, at the third sampling point SP2, the load state is the first load state (high level) and the width of the first load state period TM1 (high level pulse width) that includes the second sampling point SP2 is less than the first range width (220×T to 511×T), the load modulation pattern at the second sampling point SP2 is determined to be the first pattern PT1 (logic level "1").

On the other hand, in the case where, at the second sampling point SP2, the load state is the second load state (low level) and the width of the second load state period TM2 that includes the second sampling point SP2 is less than the second range width (80×T to 150×T, for example), the load modulation pattern at the second sampling point SP2 is determined to be the second pattern PT2 (logic level "0").

Here, the second range width (80×T to 150×T) is a range width that is set corresponding to the second load state period TM2 (128×T) in the second pattern PT2. Since the typical value of period TM2 is 128×T corresponding to 1 bit, the second range width (80×T to 150×T) is set so as to include the period 128×T.

In the present embodiment as described above, the logic level of the communication data is judged by determining the load modulation pattern. For example, in a known technique, a method is adopted in which the first load state in which the switching element SW in the load modulation unit 56 is turned on is judged to be the logic level "1", and the second load state in which the switching element SW is turned off is the logic level "0". However, in this known method, a communication data detection error due to noise or the like may occur, as described in FIG. 14.

In contrast, in the present embodiment, the logic level of each bit in the communication data is detected by determining whether the load modulation pattern is the first or second pattern PT1 or PT2, as shown in FIG. 15, for example. Accordingly, even in a situation in which there is a large amount of noise, as shown in FIG. 14, proper detection of the communication data is made possible. That is, the width of the first load state (high level) period TM1 is very different in the first and second patterns PT1 and PT2 in FIG. 15, and the logic level of each bit of the communication data is detected by identifying patterns as a result of identifying the difference of the period TM1 width in the present embodiment. For example, in the first bit synchronization in FIG. 16, in the case where the period TM1 width is less than the first range width (220×T to 511×T), the sampling point SP1 is set at the center point of the period TM1, and signals are taken in at the sampling points SP2, SP3, SP4, . . . , thereafter. Therefore, even in a case where the period TM1 width or the like at the sampling point SP1 changes due to noise, for example, proper detection of the communication data is made possible. Also, since the sampling points SP2, SP3, SP4, . . . , thereafter can be set by simple processing based on the sampling interval SI, there is an advantage in that the processing load in the detection operation of the communication data can be reduced.

Note that the communication method of the present embodiment is not limited to the method described in FIGS. 15, 16, and the like, and various modifications can be implemented. For example, although the first pattern PT1 is associated with the logic level "1" and the second pattern PT2 is associated with the logic level "0" in FIG. 15, the association relationship may be reversed. Also, the first and second patterns PT1 and PT2 in FIG. 15 are examples of the load modulation patterns, and the load modulation patterns of the present embodiment are not limited thereto and various modifications can be implemented. For example, although the first and second patterns PT1 and PT2 are set to have the same length in FIG. 15, they may be set to have different lengths. Also, in FIG. 15, although the first pattern PT1 of bit pattern (1110) and the second pattern PT2 of bit pattern (1010) are used, the first and second patterns PT1 and PT2 having different bit patterns may be adopted. For example, it is sufficient that the first and second patterns PT1 and PT2 are patterns in which at least the first load state period TM1 (or second load state period TM2) is different, and various patterns that are different from those shown in FIG. 15 can be adopted.

An example of the communication data format used in the present embodiment is shown in FIGS. 17A and 17B.

In FIG. 17A, the communication data is constituted by 64 bits, and one packet is configured by these 64 bits. The data of the first set of 16 bits is 00h. In the case where normal power transmission (or intermittent power transmission) is started on the power transmitting side by detecting the load modulation on the power receiving side, for example, a certain amount of time is required before the current detection circuit 32 or the like in the communication unit 30 operates and the communication data can be properly detected. Therefore, 00 h that is dummy (null) data is set to the first 16 bits. Various processing necessary for bit synchronization, for example, is performed on the power transmitting side in a communication period of the first 16 bits 00h.

A data code and information on the rectified voltage (VCC) are set in the second set of 16 bits. The data code is a code for specifying data that is to be transmitted by the third set of 16 bits, as shown in FIG. 17B. The rectified voltage (VCC) is used as transmitting power setting information of the power transmitting device 10. Specifically, the power supply voltage control unit 14 variably controls the power supply voltage VDRV that is supplied to the power transmission drivers DR1 and DR2 based on the rectified voltage (VCC) information or the like, and thereby variably controls the transmitting power of the power transmission unit 12.

Information such as temperature, a battery voltage, a charge current, a status flag, number of cycles, or an IC number is set to the third set of 16 bits according to the setting designated by the data code. The temperature is a battery temperature or the like, for example. The battery voltage and the charge current are the voltage (such as VBAT) and the charge current of the battery 90, and are information representing the charge state. The status flag is information representing a status on the power receiving side such as a temperature error (high temperature abnormality, low temperature abnormality), a battery error (battery voltage less than or equal to 1.0 V), an over-voltage error, a timer error, or full charge (normal end), for example. The number of cycles (cycle times) is information representing the number of charging times. The IC number is a number for specifying a control device IC. CRC information is set in the fourth set of 16 bits. The CRC is information for CRC error check.

Note that, in the case where, in FIG. 4, landing of the electronic apparatus 510 is detected and VCC becomes larger than 6.0 V, communication data of null data (dummy data) in 1 packet (64 bits), for example, is transmitted first in the load modulation in B5. The normal power transmission is started on the power transmitting side by detecting the communication data of null data.

Figure 18:
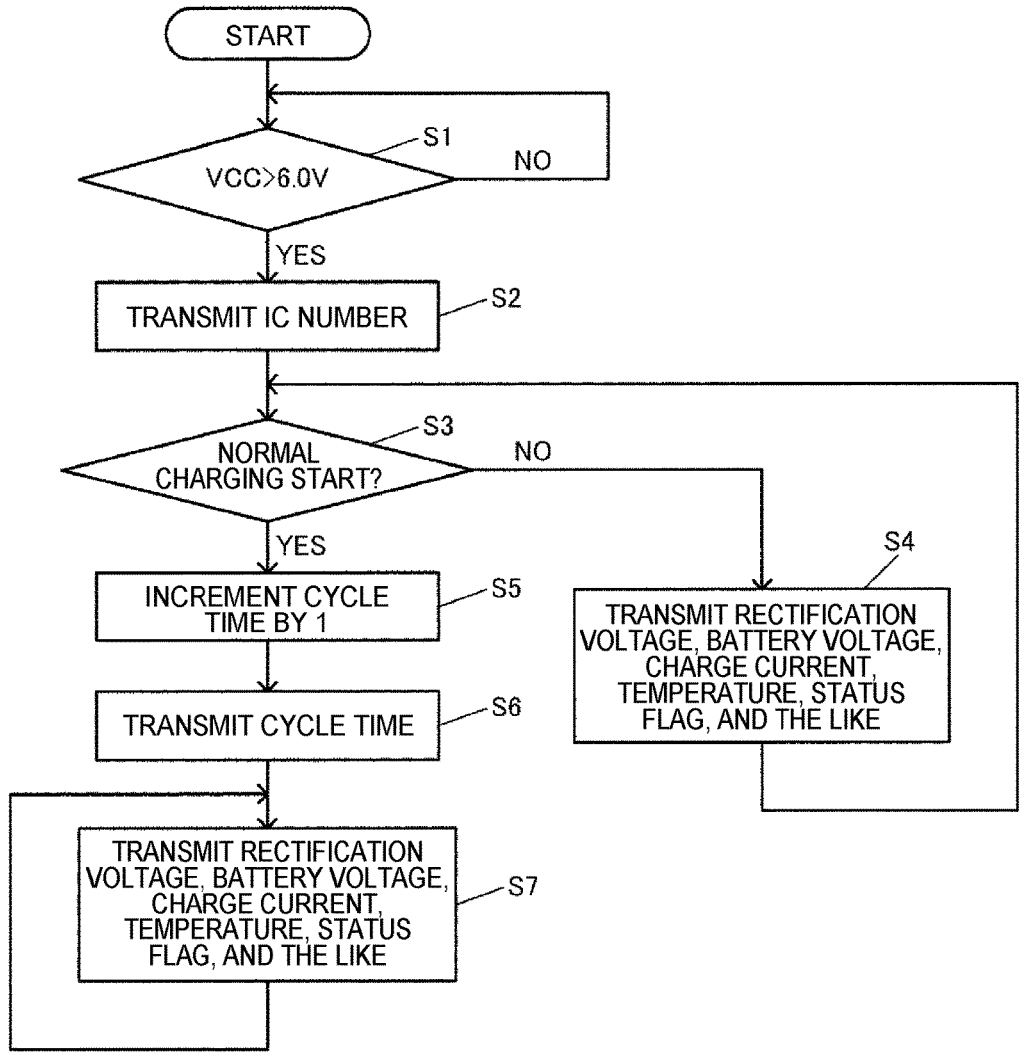
FIG. 18 is a flowchart for describing a detailed example of communication processing.

FIG. 18 is a flowchart for describing a detailed example of the communication processing of the present embodiment. First, the power receiving side (control unit 54) determines whether or not the rectification voltage VCC exceeds 6.0 V (step S1). When the power transmitting side transmits power, for example, the rectification voltage VCC increases due to the power received by the power receiving side, and VCC increases above 6.0 V. The receiving side control device 50 operates with power supplied by the transmitting power on the power transmitting side, for example. Accordingly, in a period in which power is not transmitted from the power transmitting side, the control device 50 (excluding circuits in the discharging system) is not supplied with power, and is in a reset state, for example.

When the rectification voltage VCC increases above 6.0 V, the power receiving side, first, transmits the IC number to the power transmitting side by load modulation (step S2). For example, in FIGS. 17A and 17B, the IC number is designated by a data code, and the communication data including IC number information is transmitted.

In the case where normal charging cannot be started (step S3: NO) in cases such as a case of preliminary charging (charging of an over-discharged battery) when the battery voltage VBAT is less than 2.5 V and the case of a battery error when VBAT is less than 1.0 V, the power receiving side transmits the communication data including information such as the rectification voltage, the charge voltage, the charging current, the temperature, and the status flag by load modulation (step S4).

On the other hand, in the case where the normal charging can be started (step S3: YES), the number of cycles of charging is incremented by only one (step S5), and the number of cycles after incrementation is transmitted by load modulation (step S6). Then, in a period of the normal charging, transmission of the communication data including information such as the rectification voltage, the charge voltage, the charging current, the temperature, and the status flag is repeated (step S7). The power transmitting side can determine the charging status or the like on the power receiving side based on the information.

Note that, although an example of the communication method of the present embodiment is shown in the above, the communication method of the present embodiment is not limited thereto, and various modifications can be implemented. For example, the communication method of the present embodiment is not limited to the method in which the load modulation patterns are associated with the logic levels shown in FIGS. 15 and 16, and a method in which the first load state is associated with the logic level "1" and the second load state is associated with the logic level "0", for example, or the like may be adopted. Also, the format of the communication data and the communication processing are not limited to the method shown in FIGS. 16 and 17, and various modifications can be implemented.

6. Power Receiving Unit and Charging Unit

Figure 19:
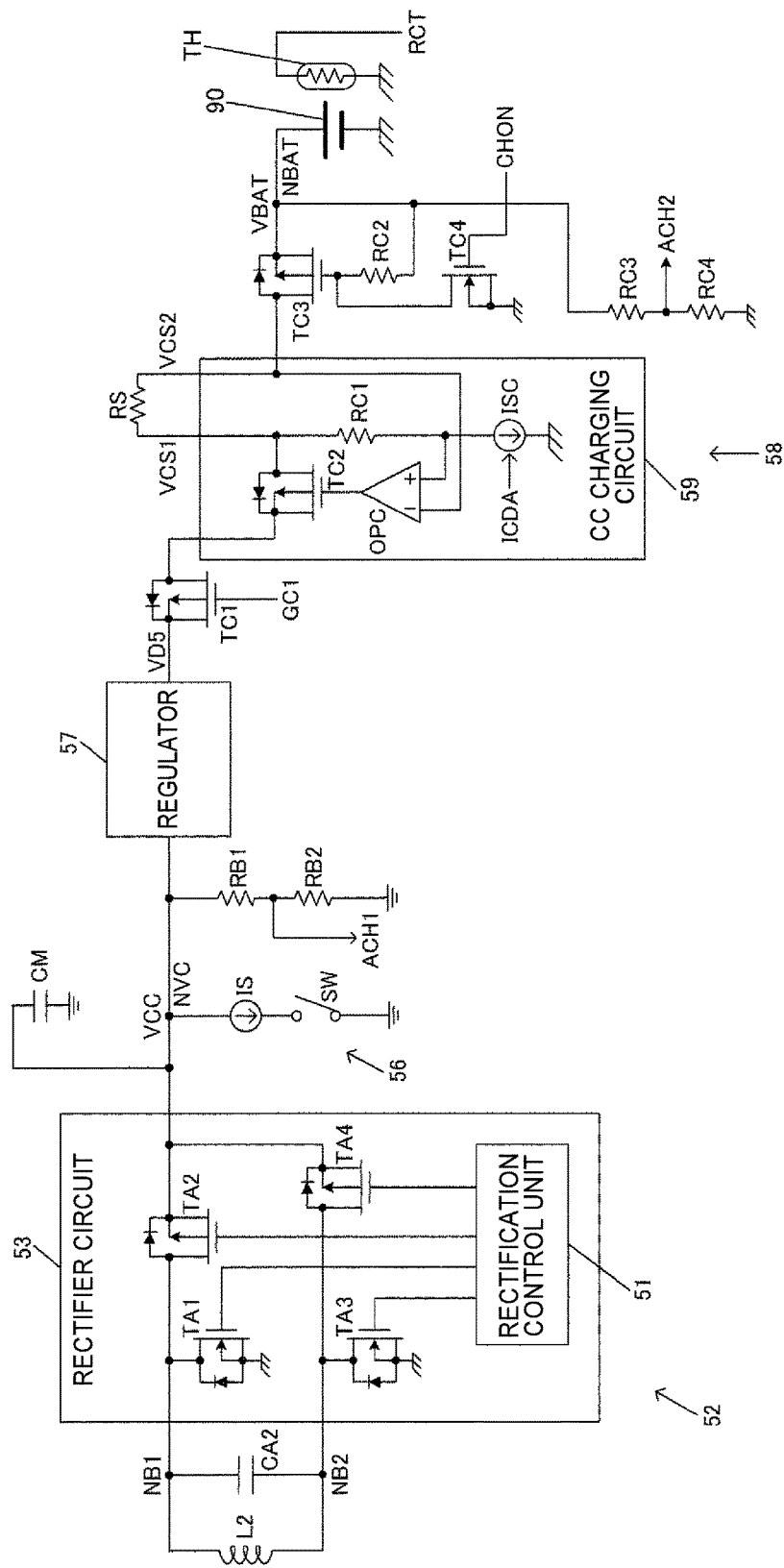
FIG. 19 is a diagram illustrating a detailed exemplary configuration of a power receiving unit and a charging unit.

A detailed exemplary configuration of the power receiving unit 52, the charging unit 58, and the like is shown in FIG. 19. The rectifier circuit 53 in the power receiving unit 52 includes transistors TA1, TA2, TA3, and TA4 for rectification and a rectification control unit 51 for controlling these transistors TA1 to TA4, as shown in FIG. 19.

The transistor TA1 is provided between a node NB1 which is one end of the secondary coil L2 and a GND (low potential side power supply voltage) node.

The transistor TA2 is provided between the node NB1 and a node NVC of the rectified voltage VCC. The transistor TA3 is provided between a node NB2 which is the other end of the secondary coil L2 and the GND node. The transistor TA4 is provided between the node NB2 and the node NVC. A body diode is provided between a drain and a source of each of the transistors TA1 to TA4. The rectification control unit 51 performs rectification control for generating the rectified voltage VCC by outputting control signals to gates of the transistors TA1 to TA4.

Resistors RB1 and RB2 are provided in series between the node NVC of the rectified voltage VCC and the GND node. A voltage ACH1 that is generated by voltage-dividing the rectified voltage VCC with the resistors RB1 and RB2 is input to the A/D converter circuit 65 in FIG. 2, for example. Accordingly, monitoring of the rectified voltage VCC is made possible, and power control or the like based on the information of the rectified voltage VCC can be realized.

The regulator 57 performs voltage adjustment (regulation) on the rectified voltage VCC, and outputs a voltage VD5. The voltage VD5 is supplied to the CC charging circuit 59 in the charging unit 58 via a transistor TC1. The transistor TC1 is turned off with a control signal GC1 when an over-voltage of the battery voltage VBAT exceeding a predetermined voltage (4.25 V, for example) is detected. Note that circuits (circuits except for circuits in a discharging system such as the discharging unit 60) in the control device 50 operate with a voltage based on the voltage VD5 (voltage resulting from regulating VD5 or the like) as a power supply voltage.

The CC charging circuit 59 includes a transistor TC2, an operational amplifier OPC, a resistor RC1, and a current source ISC. The transistor TC2 is controlled based on the output signal of the operational amplifier OPC. A non-inverting input terminal of the operational amplifier OPC is connected to one end of the resistor RC1. The other end of the resistor RC1 is connected to one end of a sense resistor RS that is provided as a component external to the control device 50. The other end of the sense resistor RS is connected to an inverting input terminal of the operational amplifier OPC. The current source ISC is provided between the non-inverting input terminal of the operational amplifier OPC and the GND node. The current that flows in the current source ISC is controlled based on a signal ICDA.

By virtual short of the operational amplifier OPC, the transistor TC2 is controlled such that the voltage on the one end of the resistor RC1 (non-inverting input terminal voltage) is equal to the voltage VCS2 on the other end of the sense resistor RS (inverting input terminal voltage). The current that flows in the current source ISC by the control of the signal ICDA is represented as IDA, and the current that flows in the resistor RS is represented as IRS. Control is performed such that the equation IRS×RS=IDA×RC1 holds. That is, in the CC charging circuit 59, the current IRS (charge current) that flows in the sense resistor RS is controlled so as to be a constant current value that is set by the signal ICDA. In this way, CC (Constant-Current) charging is made possible.

A signal CHON is activated when charging is performed. Accordingly, the transistors TC3 and TC4 are turned on, and charging to the battery 90 starts. Also, reverse flow from the battery 90 is prevented by a resistor RC2 provided between a gate of the transistor TC3 and a node NBAT of the battery voltage VBAT or the like. Resistors RC3 and RC4 are provided in series between the node NBAT and the GND node, and a voltage ACH2 that is generated by voltage-dividing the battery voltage VBAT with the resistors RC3 and RC4 is input to the A/D converter circuit 65. Accordingly, monitoring of the battery voltage VBAT is made possible, and various types of control can be realized based on the charge state of the battery 90.

Also, a thermistor TH (temperature detection unit, in a broad sense) is provided in the vicinity of the battery 90. A voltage RCT on one end of the thermistor TH is input to the control device 50, and thereby measurement of the battery temperature is made possible.

Note that although this embodiment has been described above in detail, those skilled in the art will easily understand that various modifications are possible without substantially departing from the new matter and the effect of the invention. Accordingly, all those modifications are to be encompassed in the scope of the invention. For example, a term that is used at least once together with another term having a broader or the same meaning in the specification or the drawings may be replaced with the other term in any part of the specification or the drawings. All combinations of this embodiment and the modifications are also encompassed in the scope of the invention. Configurations, operations, or the like of the control devices on the power transmitting side and the power receiving side, the power transmitting device, the power receiving device are not limited to those described in this embodiment either, and various modifications can be implemented.

REFERENCE SIGNS LIST

L1 Primary coil
L2 Secondary coil
DR1, DR2 Transmission driver
IS, ISC Current source
SW Switching element
CM Capacitor
IVC IV conversion amplifier
AP Amplifier
CP Comparator
TA1 to TA4, TC1 to TC4 Transistor
RCS, RS Sense resistor
RB1, RB2, RC1 to RC3, RP Resistor
OPC Operational amplifier
TH Thermistor (temperature detection unit)
SH Schmitt trigger
10 Power transmitting device
12 Transmission unit
14 Power supply voltage control unit
16 Display unit
20 Control device
22 Driver control circuit
24 Control unit
30 Communication unit
32 Current detection circuit
34 Comparator circuit
35 Filter unit
36 Demodulation unit
37 Clock generation circuit
38 Oscillator circuit
40 Power receiving device
50 Control device
51 Rectification control unit
52 Power receiving unit
53 Rectifier circuit
54 Control unit
55 Communication data generation unit
56 Load modulation unit
57 Regulator
58 Charging unit
59 CC charging circuit
60 Discharging unit
61 Charge pump circuit
62 Nonvolatile memory
64 Detection unit
66 Over-discharge detection circuit
70 Monitoring unit
71 Regulator
72 Oscillator circuit
73, 74 Timer
90 Battery
100 Power supply target
500 Charger
502 Power supply adapter
510 Electronic apparatus
514 Switch unit

The invention claimed is:

1. A control device on a power receiving side in a contactless power transmission system including a power transmitting device and a power receiving device, the control device comprising:
    a charging unit that charges a battery based on power received by a power receiving unit that receives power from the power transmitting device;
    a discharging unit that performs an operation of discharging the battery and supplies power from the battery to a power supply target;
    a control unit that controls the discharging unit; and
    a monitoring unit that monitors the operation state of a switch unit,
    wherein the control unit causes the discharging unit to perform discharging when removal of the power receiving device has been detected, and stops discharging of the discharging unit when an off operation of the switch unit has been detected by the monitoring unit.

2. The control device according to claim 1, wherein the control unit stops discharging of the discharging unit in a normal power transmission period.

3. The control device according to claim 2, further comprising a load modulation unit that transmits communication data to the power transmitting device by load modulation,
    wherein the control unit transmits the communication data to the power transmitting device by load modulation performed by the load modulation unit in the normal power transmission period.

4. The control device according to claim 1,
    wherein the monitoring unit includes:
    a regulator that steps down a battery voltage; and
    a resistor that is provided between an output node of the regulator and one end of the switch unit, and
    the monitoring unit judges whether or not the off operation of the switch unit has been performed based on a voltage at the one end of the switch unit.

5. The control device according to claim 4,
    wherein the monitoring unit includes:
    an oscillator circuit that performs oscillation operation based on an output voltage of the regulator, and
    a timer that measures a period in which the voltage at the one end is at a first voltage level based on a clock signal from the oscillator circuit, and
    the monitoring unit judges whether or not the off operation of the switch unit has been performed based on a measurement result of the timer.

6. The control device according to claim 1, further comprising an over-discharge detection circuit that detects an overdischarged state of the battery,
    wherein the monitoring unit stops operation when the overdischarged state is detected by the over-discharge detection circuit.

7. The control device according to claim 1,
    wherein the control unit starts discharging of the discharging unit when an on operation of the switch unit is detected by the monitoring unit after discharging of the discharging unit has stopped.

8. The control device according to claim 1,
wherein the control unit starts discharging of the discharging unit after a start-up period of the discharging operation has elapsed, the start-up period being initiated by a decrease in an output voltage of the power receiving unit.

9. The control device according to claim 8, wherein the control unit starts discharging of the discharging unit after the start-up period has elapsed after the output voltage of the power receiving unit has decreased below a judgement threshold.

10. The control device according to claim 9, wherein the control unit starts a discharging operation of a capacitor, which is charged when the power receiving unit is receiving power, when the output voltage of the power receiving unit has decreased below the judgement threshold, and starts discharging of the discharging unit when the voltage of the capacitor has decreased below a given threshold voltage.

11. An electronic apparatus comprising the control device according to claim 1.

12. A contactless power transmission system comprising a power transmitting device and a power receiving device,
wherein the power transmitting device transmits power to the power receiving device,
the power receiving device charges a battery based on power received from the power transmitting device, supplies power from the battery to a power supply target by performing a discharging operation of the battery, and monitors the operation state of a switch unit, and
the power receiving device performs the discharging operation of the battery when removal of the power receiving device is detected, and stops the discharging operation of the battery when an off operation of the switch unit is detected.

* * * * *